US009621342B2

(12) United States Patent
Jakobsson et al.

(10) Patent No.: US 9,621,342 B2
(45) Date of Patent: Apr. 11, 2017

(54) SYSTEM AND METHOD FOR HIERARCHICAL CRYPTOGRAPHIC KEY GENERATION USING BIOMETRIC DATA

(71) Applicant: QUALCOMM Incorporated, San Diego, CA (US)

(72) Inventors: Bjorn Jakobsson, Portolla Valley, CA (US); Seyedhossein Siadati, Brooklyn, NY (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 14/679,840

(22) Filed: Apr. 6, 2015

(65) Prior Publication Data

US 2016/0294555 A1 Oct. 6, 2016

(51) Int. Cl.
*H04L 29/06* (2006.01)
*H04L 9/08* (2006.01)
*G06F 21/00* (2013.01)

(52) U.S. Cl.
CPC .......... *H04L 9/0866* (2013.01); *H04L 9/0836* (2013.01)

(58) Field of Classification Search
None
See application file for complete search history.

(56) References Cited

U.S. PATENT DOCUMENTS

| | | | | |
|---|---|---|---|---|
| 6,035,398 A * | 3/2000 | Bjorn | ................ | G06K 9/00006 713/185 |
| 7,844,827 B1 | 11/2010 | Itoi | | |
| 8,965,066 B1 * | 2/2015 | Derakhshani | ............. | H04L 9/14 382/117 |
| 2002/0104006 A1 * | 8/2002 | Boate | .................. | H04L 63/0853 713/186 |
| 2007/0255963 A1 * | 11/2007 | Pizano | .................... | G06F 21/32 713/189 |
| 2008/0101663 A1 * | 5/2008 | Lo | .......................... | G06K 9/001 382/124 |

(Continued)

OTHER PUBLICATIONS

Fonte A.R., et al., "Fingerprint Reconstruction and Orientation Field Estimation: A Review," Biometrics Research Team, Advanced Technologies Application Center (CENATAV), 2015, 32 pages.
Ne Ma B., et al., "Multi Purpose Code Generation Using Fingerprint Images," The International Arab Journal of Information Technology, Oct. 2009, vol. 6 (4), pp. 418-423.
Rao B.R., et al., "Finger Print Parameter Based Cryptographic Key Generation," International Journal of Engineering Research and Applications (IJERA), Nov.-Dec. 2012, vol. 2 (6), pp. 1598-1604.

(Continued)

*Primary Examiner* — Shin-Hon Chen
(74) *Attorney, Agent, or Firm* — Loza & Loza, LLP

(57) ABSTRACT

A cryptographic key is generated using biometric data and a hierarchy of biometric descriptors. The hierarchy of biometric descriptors includes multiple levels, wherein a biometric descriptor at a first level is associated with a subset of the biometric descriptors at the next lower level. To generate a cryptographic key, biometric data is collected and compared to the biometric descriptors at the first level of the hierarchy. One of the biometric descriptors is selected at the first level, and a first key component is generated based on the first selected biometric descriptor. The biometric data is then compared to the subset of biometric descriptors at the second level of the hierarchy associated with the first selected biometric descriptor. This process of selecting a biometric descriptor and generating a key component continues for each level of the hierarchy. The key components are then used to generate a cryptographic key.

34 Claims, 17 Drawing Sheets

(56) References Cited

U.S. PATENT DOCUMENTS

| | | | | |
|---|---|---|---|---|
| 2009/0310779 | A1* | 12/2009 | Lam | G06K 9/00093 |
| | | | | 380/46 |
| 2010/0080425 | A1 | 4/2010 | Bebis et al. | |
| 2013/0159021 | A1* | 6/2013 | Felsher | G06F 19/322 |
| | | | | 705/3 |
| 2014/0032924 | A1* | 1/2014 | Durham | G06F 21/10 |
| | | | | 713/186 |
| 2014/0095885 | A1* | 4/2014 | Bringer | G06F 21/32 |
| | | | | 713/186 |
| 2014/0139318 | A1* | 5/2014 | Malpani | G06F 21/32 |
| | | | | 340/5.82 |
| 2014/0211944 | A1* | 7/2014 | Hayward | H04L 9/0866 |
| | | | | 380/281 |
| 2015/0046699 | A1* | 2/2015 | Benteo | G06F 21/32 |
| | | | | 713/156 |
| 2015/0381615 | A1* | 12/2015 | Schlesinger | H04L 63/0861 |
| | | | | 713/168 |
| 2016/0219046 | A1* | 7/2016 | Ballard | H04L 63/0861 |

OTHER PUBLICATIONS

Cappelli R., "SFinGe: an Approach to Synthetic Fingerprint Generation", in proceedings International Workshop on Biometric Technologies (BT2004), Calgary, Canada, XP055203149, pp. 147-154, Jun. 2004 http://math.la.asu.edu/~dieter/courses/Math_Modeling_2013/Cappelli_2004.pdf.
International Search Report and Written Opinion—PCT/US2016/023628—ISA/EPO—Dec. 16, 2016.

\* cited by examiner

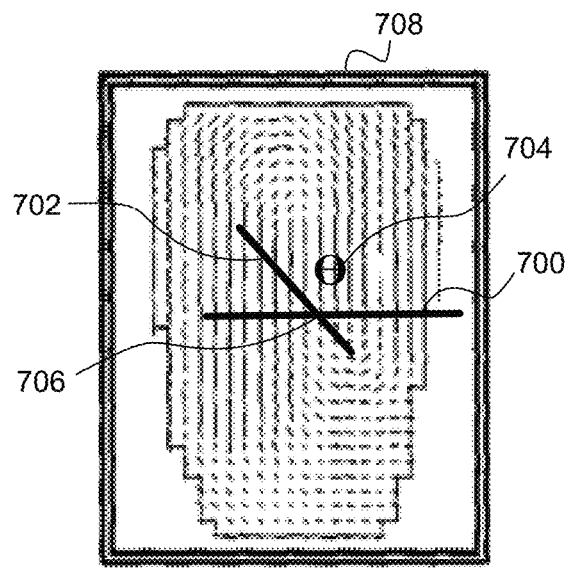
FIG. 7
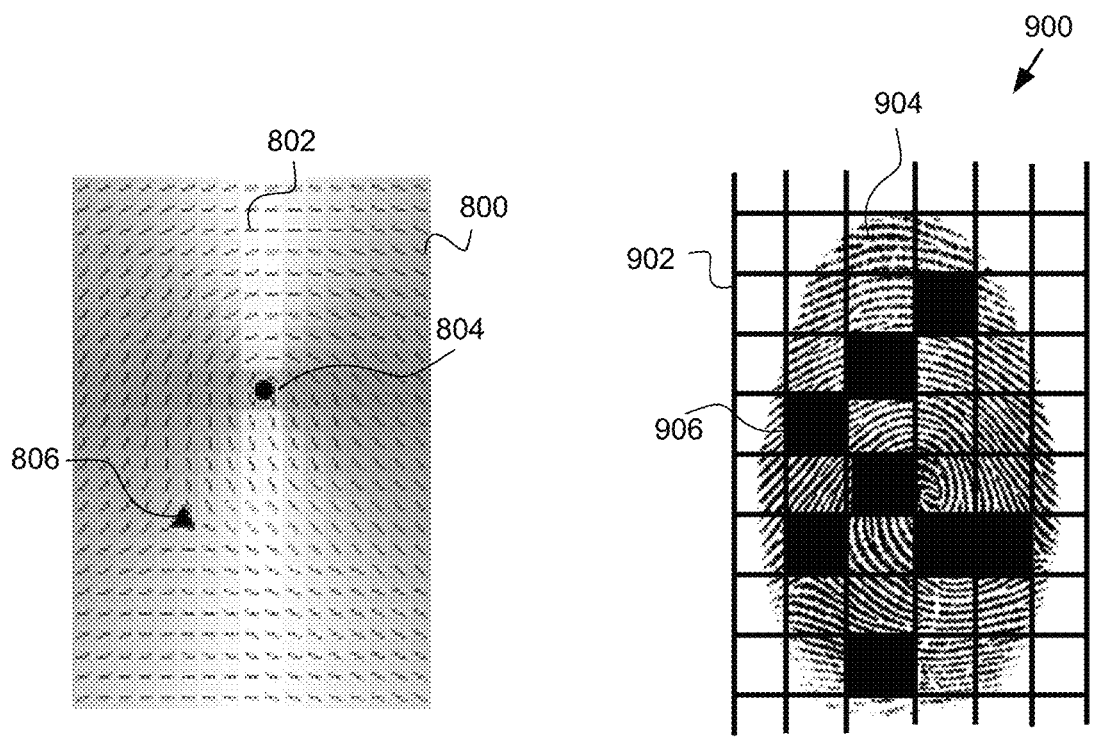
FIG. 8
FIG. 9

SYSTEM AND METHOD FOR HIERARCHICAL CRYPTOGRAPHIC KEY GENERATION USING BIOMETRIC DATA

FIELD

The present disclosure relates to encryption techniques, and more specifically, to the generation of a cryptographic key using biometric data.

BACKGROUND

One cryptology scheme is a public key cryptosystem which uses two keys, a public key and a private key that is kept secret. Messages are encrypted using the public key and can only be decrypted using the corresponding private key. For example, a sender encrypts a message with respect to a given public key and only the owner of the private key associated with public key can decrypt the resulting ciphertext and recover the message. Examples of public key cryptosystems include RSA, Digital Signature Standard (DSS), Paillier cryptosystem, and Diffice-Hellman key exchange protocol. Another encryption scheme is a symmetric key cryptosystem that uses a single secure key for encryption and decryption. The secure key is exchanged between parties in a secure initial exchange, and is then used by both parties to encrypt and decrypt messages. Examples of symmetric key cryptosystems include Twofish, Serpent, AES, Blowfish, CAST5, RC4 and IDEA. In addition, hybrid cryptosystems employ both public key cryptosystems and symmetric key cryptosystems. For example, a symmetric key is generated by a sender and encrypted in a message with a recipient's public key. The recipient decrypts the message with its corresponding private key to obtain the symmetric key. The sender and recipient then encrypt and decrypt messages using the symmetric key.

One method to generate cryptographic keys, such as a private key or symmetric key, includes the use of biometric data. However, the use of biometric data can be imprecise and non-repeatable due to the nature of the biometric data collection. For example, an image of a biometric such as a fingerprint or retina may vary depending on the quality of the scanning techniques, movement of the biometric during scanning, background conditions, worn or injured fingertips, etc. In addition, the collection of biometric data raises privacy concerns about the possible unauthorized access and use of the biometric information.

Therefore, a solution is needed that allows use of biometric data for generation of cryptographic keys that is robust and secure.

SUMMARY

According to one aspect, a method is provided for obtaining biometric data and generating a cryptographic key using the biometric data and a hierarchy of biometric descriptors. A first biometric descriptor at a first level of the hierarchy of biometric descriptors is selected using the biometric data. A first key component associated with the first biometric descriptor is obtained. A second biometric descriptor at a second level of the hierarchy of biometric descriptors is selected using the biometric data. A second key component associated with the second biometric descriptor is obtained. A cryptographic key is then generated using at least the first key component and the second key component.

For example, the first level of the hierarchy of biometric descriptors includes a first plurality of biometric descriptors and the second level includes a second plurality of biometric descriptors, wherein a subset of the second plurality of biometric descriptors at the second level is associated with the first biometric descriptor selected at the first level. The biometric data is compared with this subset of the second plurality of biometric descriptors at the second level to select the second biometric descriptor at the second level.

The hierarchy of biometric descriptors may also include additional lower levels. At least one additional lower level of the hierarchy of biometric descriptors is obtained. For each additional lower level, an additional biometric descriptor and additional key component is obtained. The cryptographic key is then generated using at least the first key component, the second key component and any additional key components.

In an exemplary embodiment, the biometric data includes fingerprint data. A first level of a hierarchy of biometric descriptors includes a plurality of fingerprint types and a second level of the hierarchy of biometric descriptors includes a plurality of distributions of macro-singularities. The hierarchy of biometric descriptors may further include additional lower levels, such as a third level including a plurality of third level ridge maps and a fourth level including a plurality of fourth level grid patterns. To select one of the third level ridge maps, the fingerprint data for at least one fingerprint is processed to obtain a ridge map. An orientation angle of a ridge is obtained at a plurality of points in the fingerprint data for the at least one fingerprint. The orientation angles are represented as vectors at the plurality of points to generate the ridge map. The ridge map is compared to a subset of the plurality of ridge maps at the third level of the hierarchy associated with the selected second level biometric descriptor, and a third level ridge map is selected. A third key component is obtained based on the selected third level ridge map.

To select one of the fourth level grid patterns in the hierarchy, the fingerprint data is processed to obtain a grid pattern. The ridge map generated based on the fingerprint data for the at least one fingerprint is aligned with the selected third level ridge map. An m*n grid is overlaid on the ridge map, and cells in the m*n grid that meet a specified criteria are selected. A grid pattern is generated based on the selected cells. The grid pattern is compared to a subset of the plurality of grid patterns at the fourth level associated with the selected third level ridge map, and a fourth level grid pattern is selected. A fourth key component is obtained based on the selected fourth level grid pattern. The cryptographic key is then generated using the first key component, the second key component, the third key component and the fourth key component or a subset thereof.

According to another aspect, a device comprises a biosensor circuit configured to obtain biometric data and a processing circuit coupled to the biosensor circuit. The processing circuit is configured to select a first biometric descriptor at a first level of a hierarchy of biometric descriptors using the biometric data and obtain a first key component associated with the first biometric descriptor. The processing circuit is further configured to select a second biometric descriptor at a second level of the hierarchy of biometric descriptors using the biometric data and obtain a second key component associated with the second biometric descriptor. The processing circuit is further configured to obtain a cryptographic key using at least the first key component and the second key component.

According to another aspect, a hierarchy of biometric descriptors having a plurality of levels is obtained wherein each of a first plurality of biometric descriptors at a first level of the hierarchy of biometric descriptors is associated with a different first key component and each of a second plurality of biometric descriptors at a second level of the hierarchy of biometric descriptors is associated with a different second key component. In an exemplary embodiment, the first plurality of biometric descriptors and the second plurality of biometric descriptors are synthetically pre-generated, wherein the first plurality of biometric descriptors includes a plurality of synthetically generated ridge maps and wherein the second plurality of biometric descriptors includes a plurality of synthetically generated grid patterns.

The hierarchy of biometric descriptors is transmitted to a client device. In an embodiment, the hierarchy is transmitted to the client device in response to an initiation of a transaction with the client device. For example, the server receives a request from the client device to generate a cryptographic key for a registered user associated with a user identifier, and the server transmits the hierarchy of biometric descriptors to the client device in response thereto. In another example, a public key is received from the client device, wherein the public key is based at least in part on the first key component and the second key component.

In some embodiments, an updated hierarchy of biometric descriptors may be received from the client device, wherein at least one biometric descriptor in the updated hierarchy includes biometric data associated with a user identifier. In other possible embodiments, an updated hierarchy of biometric descriptors is received from the client device, wherein a subset of the second plurality of biometric descriptors in the second level includes a sparse biometric descriptor having a similarity parameter less than a first specified threshold in comparison with a biometric descriptor derived from biometric data associated with a user identifier. The subset of the second plurality of biometric descriptors in the second level also includes a plurality of selected biometric descriptors having a similarity parameter greater than a second specified threshold in comparison with the sparse biometric descriptor.

In another aspect, a server comprises a network interface configured to communicate with a client device and a processing circuit operably coupled to the network interface. The processing circuit is configured to obtain a hierarchy of biometric descriptors having a plurality of levels, wherein each of a first plurality of biometric descriptors at a first level of the hierarchy of biometric descriptors is associated with a different first key component and each of a second plurality of biometric descriptors at a second level of the hierarchy of biometric descriptors is associated with a different second key component. The processing circuit is further configured to transmit the hierarchy of biometric descriptors to the client device.

DRAWINGS

Some embodiments of apparatus or methods in accordance with embodiments of the disclosure are now described, by way of example only, and with reference to the accompanying drawings.

FIG. 7 illustrates a schematic block diagram of an embodiment of a fingerprint and the orientation θ of a sample ridge.

FIG. 8 illustrates a schematic block diagram of an embodiment of a ridge map.

FIG. 9 illustrates a schematic block diagram of an embodiment of a grid pattern.

DETAILED DESCRIPTION

The description and drawings merely illustrate the principles of various embodiments. It will thus be appreciated that those skilled in the art will be able to devise various arrangements that, although not explicitly described or shown herein, embody the principles herein and in the claims and fall within the spirit and scope of the disclosure. Furthermore, examples recited herein are principally intended to be for pedagogical purposes to aid in understanding the embodiments and the concepts and are to be construed as being without limitation to such specifically recited examples and embodiments. Moreover, statements herein reciting certain embodiments and specific examples are intended to encompass equivalents thereof.

Overview

A hierarchy is generated that includes multiple levels of biometric descriptors, wherein a biometric descriptor at a first level is associated with a subset of the biometric descriptors at the next lower level. To generate a cryptographic key, biometric data is obtained and compared to the biometric descriptors at the first level of the hierarchy. One of the biometric descriptors is selected at the first level, and a first key component is obtained based on the first selected biometric descriptor. The biometric data is then compared to the subset of biometric descriptors at the second level of the hierarchy associated with the first selected biometric descriptor. One of these biometric descriptors in the subset at the second level is selected, and a second key component is obtained. Thus, the biometric data only needs to be compared with a subset of the biometric descriptors at the second level of the hierarchy. This decreases the number of comparisons and processing time and computational load while still providing randomness in the process of generating a cryptographic key.

The process of selecting a biometric descriptor and generating a key component continues for each level of the hierarchy. For example, when the hierarchy includes N levels, then N selections of biometric descriptors are made, and N key components are generated. The N key components are then used to generate a cryptographic key.

Exemplary Cryptographic Key Generation and Extraction Using Biometric Data

Figure 1:
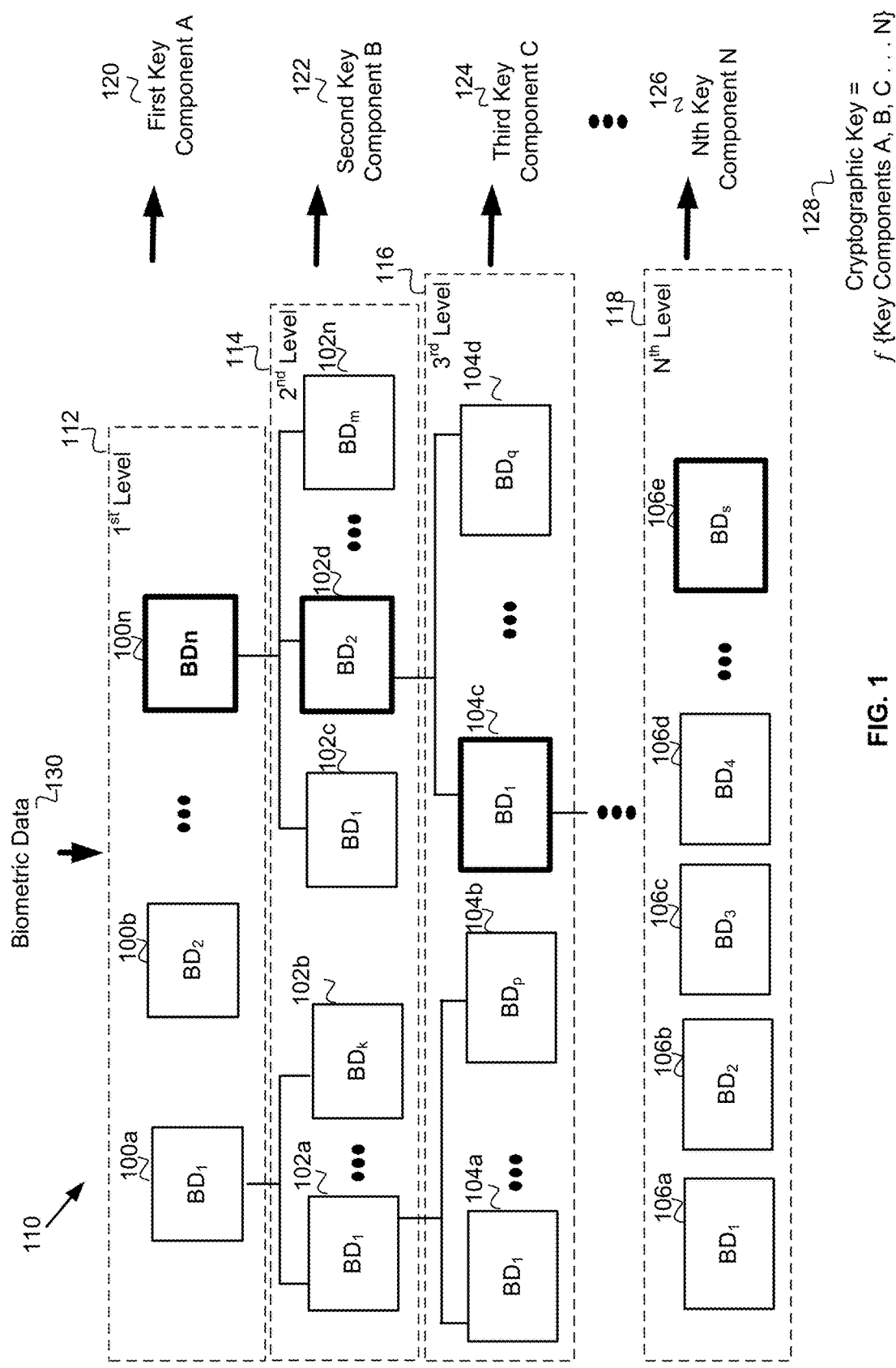
FIG. 1 illustrates a schematic block diagram of an embodiment of a hierarchy of biometric descriptors for generation of a cryptographic key.

FIG. 1 illustrates a schematic block diagram of an embodiment of a hierarchy of biometric descriptors for generation of a cryptographic key. The hierarchy 110 of biometric descriptors includes a plurality of levels 112, 114, 116, 118 of biometric descriptors (BD) 100, 102, 104, 106. The hierarchy 110 has a tree-like structure wherein a biometric descriptor at a higher level of the hierarchy 110 is associated with a subset of the biometric descriptors at a lower level of the hierarchy 110. For example, $BD_1$ in the first level 112 of the hierarchy 110 is associated with the subset of biometric descriptors $BD_{1-k}$ in the second level 114, and $BD_j$ in the first level 112 of the hierarchy 110 is associated with the subset of biometric descriptors $BD_{1-m}$ in the second level 114. The subsets at a same level may include different numbers of biometric descriptors, e.g. the number of biometric descriptors 102 in subset $BD_{1-k}$ may be more or less or equal to the number of biometric descriptors 102 in subset $BD_{1-m}$. In addition, different levels may include a different number of biometric descriptors, such as the second level 114 may include more biometric descriptors than the first level 112 but less than the third level 116. In the example shown in FIG. 1, the hierarchy 110 includes N levels, wherein N is equal to two or more.

The biometric descriptors at the lower levels in the hierarchy 110 preferably have more detail or complexity than biometric descriptors at higher levels. For example, the biometric descriptors 102 at the second level 114 have a similar level of complexity or detail, but more detail than the biometric descriptors 100 at the first level 112, and the third level biometric descriptors 104 include more details or complexity than the second level biometric descriptors 102. In addition, the biometric descriptors at a lower level are preferably random or independent with respect to the biometric descriptors at higher levels. The number of levels 112, 114, 116, 118, or the number of biometric descriptors 100, 102, 104, 106 or a combination thereof may be adjusted to achieve a desired randomness or entropy value. The biometric descriptors 100, 102, 104, 106 may be constructed from a collection of actual biometric data, synthetic biometric data or a combination thereof.

In an embodiment, the hierarchy 110 is pre-generated for a plurality of system users. The hierarchy 110 is stored in a central system and downloaded to a user's device upon request. The hierarchy 110 is then obtained and used in key generation, e.g. both key extraction and recovery processes, as described herein by a plurality of users. In an embodiment, to preserve the security of a user's biometric data, the hierarchy 110 does not include a single biometric descriptor 100, 102, 104, 106 that matches an entirety or substantial portion of the user's biometric data 130. For example, no biometric descriptor includes a substantial portion of the user's biometric data such that an identity of a particular biometric or user is discernable. Thus, a user's biometric data 130 may not be discerned from a biometric descriptor or the hierarchy 110 alone. This increases security over existing methods that store a small number of templates (e.g., approximately less than 10) including a user's biometric data and then match the biometric data 130 to the templates. In these existing methods, in the event of an unauthorized access, the biometric data 130 of the user can be discerned from the templates, and the cryptographic key generated from the templates as well.

In use, biometric data 130 is first compared with biometric descriptors 100 at the first level 112 and a first biometric descriptor $BD_n$ 100n is selected as illustrated by the highlighted block. Based on this first selected biometric descriptor $BD_n$ 100n, both an associated first key component A 120 and a subset of associated second level biometric descriptors $BD_{1-m}$ 102 are obtained. The biometric data 130 is then compared with the second-level biometric descriptors $BD_{1-m}$ 102 and a second biometric descriptor $BD_2$ 102d is selected as illustrated by the highlighted block. Again based on this second selected biometric descriptor $BD_2$ 102d, both an associated second-level key component B 122, and a subset of associated third-level biometric descriptors $BD_{1-q}$ 104 are obtained. As further seen in FIG. 1, biometric descriptor $BD_1$ 104c in the third level is then selected based on the biometric data 130, and the third key component C 124 is obtained. This process continues until a biometric descriptor 106 is selected at the Nth level 118 of the hierarchy 110 and a corresponding Nth key component 126 is obtained.

The N key components or a subset thereof are used to obtain a cryptographic key 128. For example, a cryptographic hash function may be applied to the N key components or to a subset thereof to obtain the cryptographic key 128. Other methods may also be employed to obtain the cryptographic key 128 using the N key components or a subset thereof.

Figures 2, 3:
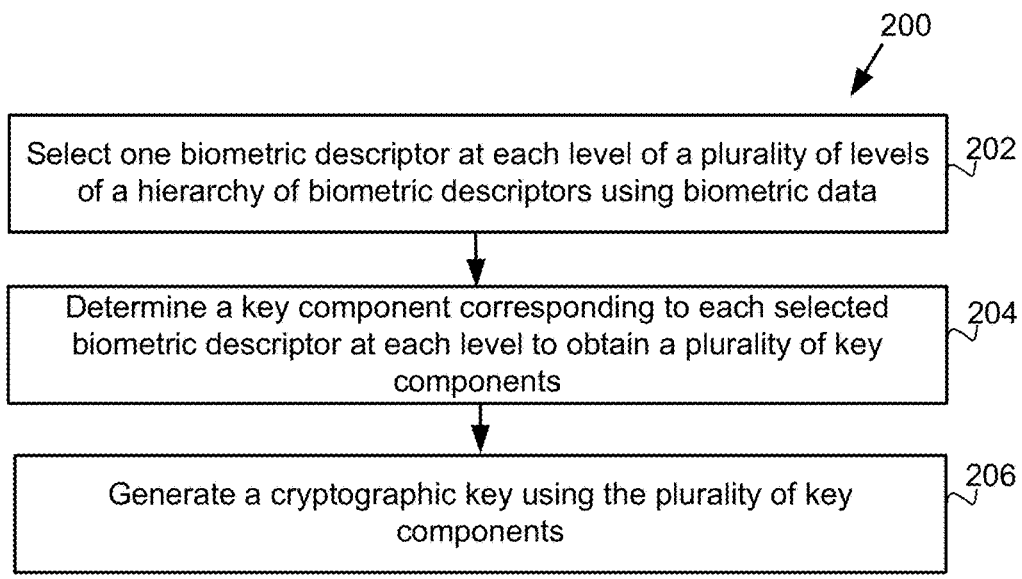
FIG. 2 illustrates a logical flow diagram of an embodiment of a method for generation of a cryptographic key using biometric data.
FIG. 3 illustrates a logical flow diagram of another embodiment of a method 300 for generation of a cryptographic key using biometric data.

FIG. 2 illustrates a logical flow diagram of an embodiment of a method 200 for generation of a cryptographic key using biometric data. Biometric data is obtained by a device, e.g. from a biometric sensor incorporated in the device or coupled to the device or from another device over a secure connection. The biometric data may include images, data, or other information of the particular biometric. The biometric data may be processed, manipulated or other data derived from the biometric data for use in the comparison and selection of the biometric descriptors 100 as described herein. The hierarchy of biometric descriptors is accessed by the device. The hierarchy may already be stored on the device or may be requested and downloaded from a cryptographic server.

One biometric descriptor at each level of a plurality of levels of a hierarchy of biometric descriptors is selected using biometric data 202. A key component corresponding to each selected biometric descriptor at each level is determined to obtain a plurality of key components 204. A cryptographic key is generated using the plurality of key components or a subset of a plurality of key components 206. A public key may also be generated using the cryptographic key. Thu, the public key is also based at least in part on the key components or subset thereof as described herein A user identifier and any generated public key are transmitted to the cryptographic server to be stored as "biometric lock" information. The biometric lock information includes the user identifier, identification of the biometric(s) (such as identification of the set of fingerprints, retina, etc.) used for key generation, and a version identifier of the hierarchy used to generate the cryptographic key as well as any public key generated or other configuration information.

FIG. 3 illustrates a logical flow diagram of another embodiment of a method 300 for generation of a cryptographic key using biometric data. To start the process of key generation, a user identifier is obtained by a device. For example, a user enters a username or password on the device. A request is sent to the cryptographic server indicating the user identifier. The device obtains the biometric lock information associated with the user identifier including the version of the hierarchy of biometric descriptors used to first generate the cryptographic key. A user is then requested to scan at least one biometric identified in the biometric lock information. In an embodiment, a user may be requested to scan multiple biometrics, such as multiple fingerprints. In addition, different biometrics may be scanned, such as a fingerprint and retina. The device then scans or images the requested biometrics of the user and obtains the biometric data.

A first biometric descriptor is selected at a first level of the hierarchy of biometric descriptors using biometric data 302. A first key component is then obtained based on the first biometric descriptor 304. A second biometric descriptor at the second level of the hierarchy of biometric descriptors is obtained using the biometric data 306. The method then compares the biometric data to the biometric descriptors at the next lower level of the hierarchy 110, and a second biometric descriptor is selected 210. A key component associated with the second biometric descriptor at the second level is obtained 308. If the hierarchy includes another lower level, then the process repeats until a biometric descriptor is selected and a key component has been obtained for each level. A cryptographic key is then generated using the key components or a subset of the key components 310.

The cryptographic key may then be used for encryption, decryption, authentication, digital certificate or for other purposes and functions.

Figure 4:
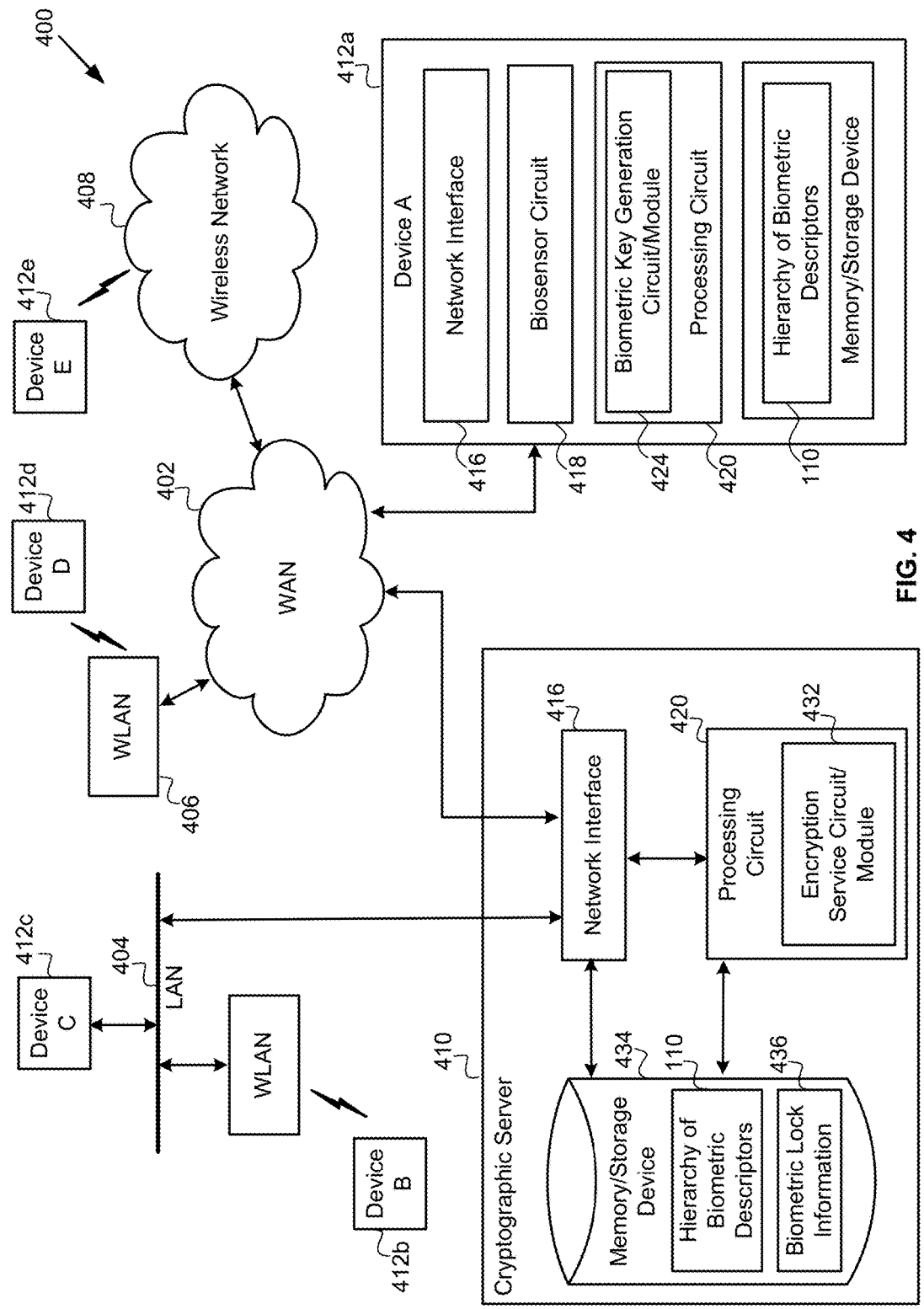
FIG. 4 illustrates a schematic block diagram of an embodiment of a communication network.

FIG. 4 illustrates a schematic block diagram of an embodiment of an exemplary communication network 400 in which the method described herein may operate. The exemplary communication network 400 includes one or more networks that are communicatively coupled, such as wide area network (WAN) 402, local area network (LAN) 404, wireless local area networks (WLAN) 406, wireless network 408. LAN 404 and WLAN 406 may operate in a home or enterprise environment. The wireless network 408 may include, for example, a 3G or 4G cellular network, GSM network, WIMAX network, EDGE network, GERAN network, etc. or a satellite network or a combination thereof.

Any of the devices, such as the device A 412a, the device B 412b, the device C 412c, the device D 412d and the device E 412e, may include, for example, a personal computer, a laptop, a mobile phone, and a smart tablet, a point of sale device, a vehicle or other type of device operable to perform functions described herein. The device A 412a is shown in more detail. The various components of the device A 12a may also be included in the other exemplary devices 412b, 412c, 412d and 412e. The exemplary device A 412a includes a network interface 416, a biosensor circuit 418, a processing circuit 420 and a memory/storage device 422. The network interface 416 includes an interface for wireless and/or wired network communications. The network interface 416 may also include authentication capability that provides authentication prior to allowing access to some or all of the resources of the device 412. The network interface 416 may also include firewall, gateway and proxy server functions.

In an exemplary embodiment, the biosensor circuit 418 includes one or more cameras or scanners to capture images of a biometric or multiple biometrics. A biometric is a physiological characteristic that provides a distinctive, measurable identifier of an individual. A biometric may include a fingerprint, palm veins, face recognition, DNA, palm print, iris recognition, retina scan, voice, etc. Multimodal biometric sensors can obtain multiple images from a same biometric (i.e., multiple images of an iris, or scans of the same finger) or obtain information from different biometrics (scan of multiple fingers or scan of fingerprints along with voice recognition or face recognition). Multimodal biometric systems can obtain the biometric data of multiple biometrics sequentially, simultaneously, a combination thereof, or in series. The biosensor circuit may use two-dimensional or three dimensional imaging techniques or other type of sensors to capture the biometric data of a biometric or multiple biometrics. The biosensor circuit 418 may also include other sensors for anti-spoofing, such as temperature, movement and blood pressure sensors.

Processing circuit 420 includes a biometric key generation circuit/module 424 that performs the functions described herein for generation of a cryptographic key from biometric data. A memory/storage device 422 stores the hierarchy 110 of biometric descriptors and other configuration information.

A cryptographic server 410 includes a local or remote server for providing an encryption service to devices 412. The cryptographic server 410 includes an encryption service circuit/module 432 that functions to provide the encryption service for the devices 412. Memory/storage device 434 stores the hierarchy 110 of biometric descriptors and biometric lock information 436 associated with the users of the encryption service. Memory/storage device 434 may be implemented in one or more internal memory devices, detached memory devices, network attached storage devices, storage area networks, or other memory devices located in one geographical location or multiple geographical locations.

Various examples of the hierarchy of biometric descriptors and the key generation methods are now described wherein the biometric includes fingerprint data of at least one fingerprint.

Figure 5:
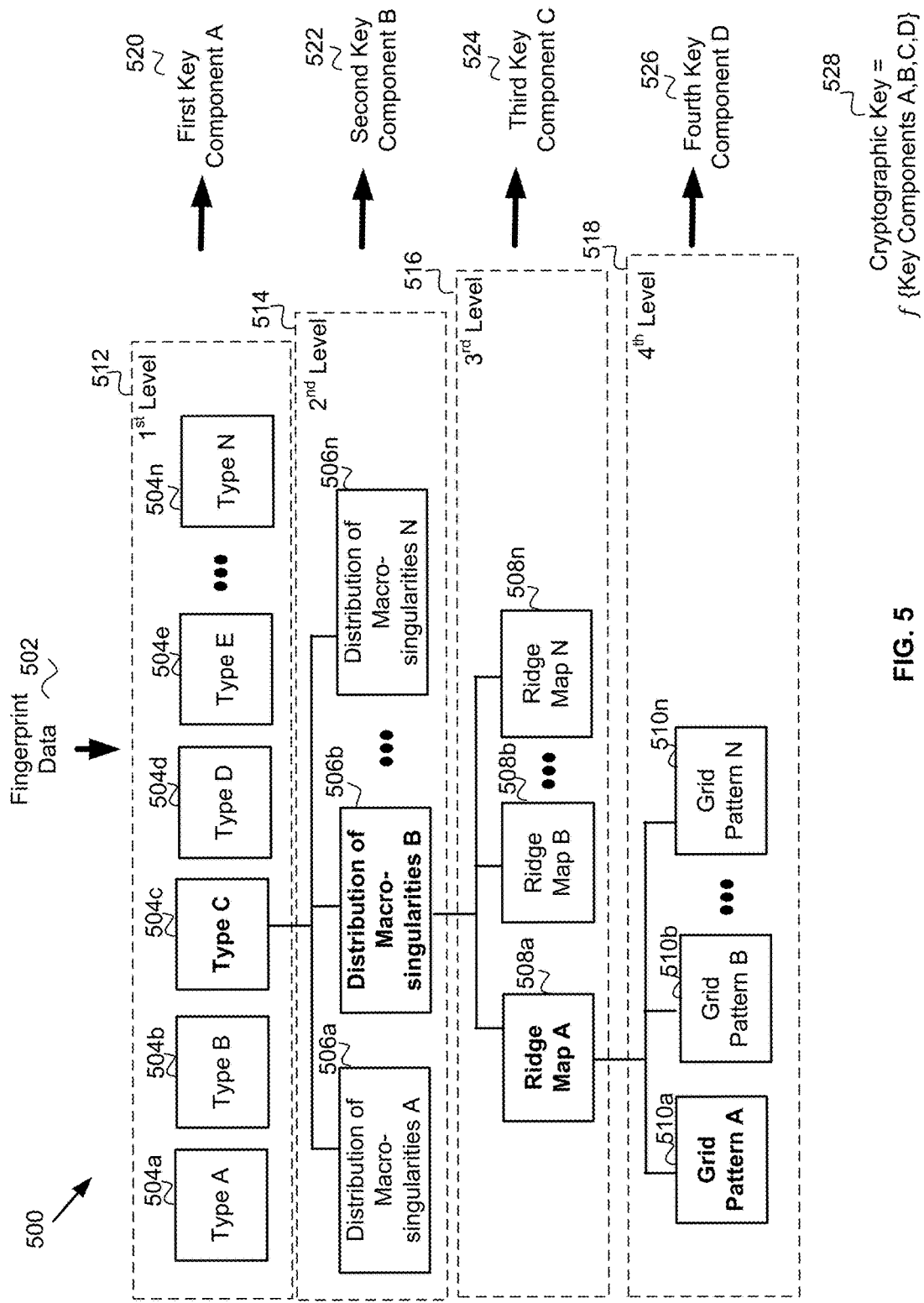
FIG. 5 illustrates a schematic block diagram of another embodiment of a hierarchy of biometric descriptors for generation of a cryptographic key.

Exemplary Hierarchy of Biometric Descriptors for Cryptographic Key Generation Using Fingerprint Data FIG. 5 illustrates a schematic block diagram of another embodiment of a hierarchy 500 of biometric descriptors for generation of a cryptographic key 528, wherein the biometric data includes fingerprint data 502. The biometric descriptors 504 at the first level 512 include six types of fingerprints: an arch, a tented arch, a left loop, a right loop, a plain whorl and a double whorl.

Figure 6:
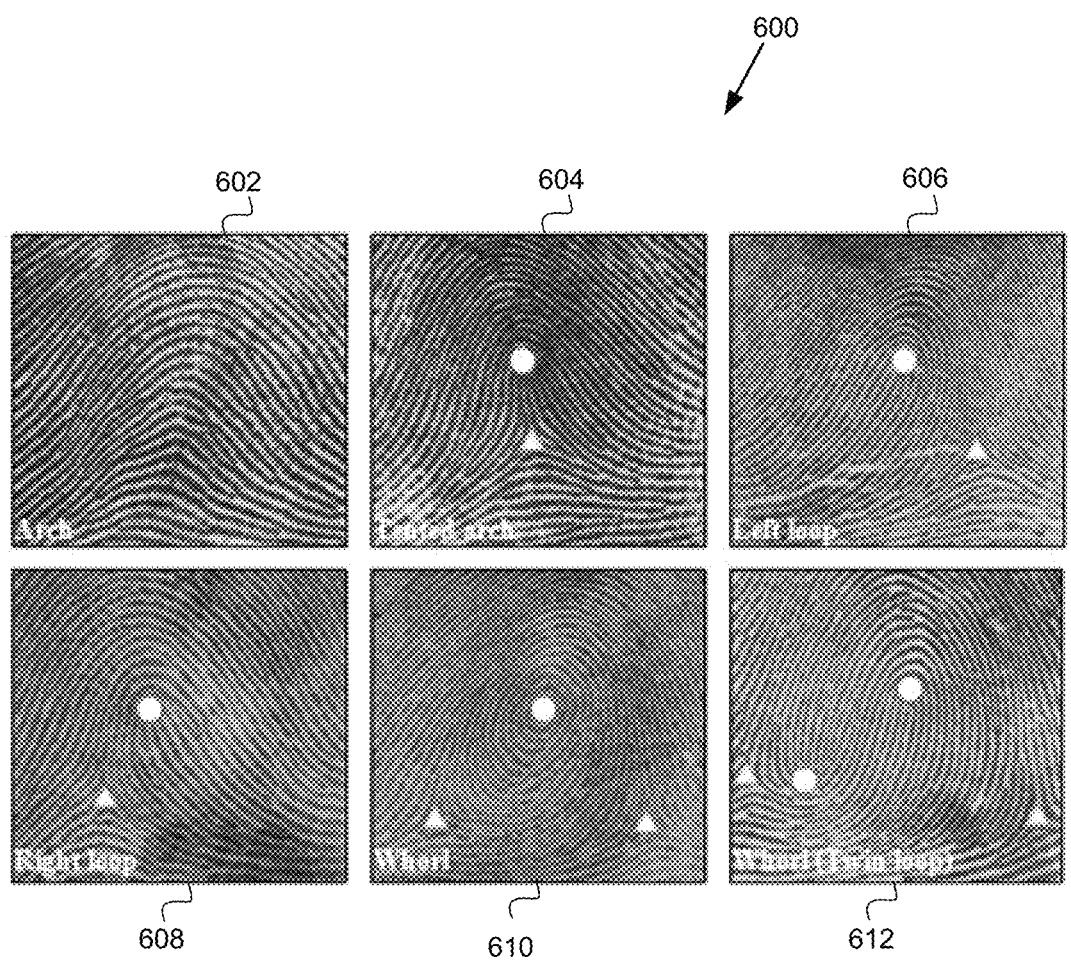
FIG. 6 illustrates a schematic block diagram of types of fingerprints used in an embodiment of a hierarchy of biometric descriptors.

Referring now to FIG. 6, it illustrates a schematic block diagram of the six types 600 of fingerprints. An arch 602 is a fingerprint type identifying a fingerprint without any macro-singularities. A tented arch 604 is a fingerprint with one core and one delta in which the axis of symmetry goes through the delta. A left loop 606 has one pair of core and delta in which the delta is in the right side of symmetry point. A right loop 608 has one pair of core and delta in which the delta is in the left side of symmetry. A plain whorl 610 contains two deltas and one core. A double whorl 612 contains two cores and two deltas.

Referring back to FIG. 5, the six types of fingerprints 505 in the first level 512 of the hierarchy 500 are each associated with a different first level key component A 520. For example, if $Type_i$ represents the $i_{th}$ type fingerprint, then $K_i$ represents the associated first key component A 520.

For the second level 514, the biometric descriptors are based on distributions 506 of macro-singularities. In an embodiment the macro-singularities include cores and deltas. For example, the distributions 506 of macro-singularities include various configurations or arrangements of cores and deltas in a fingerprint. The distributions 506 of macro-singularities in the second level are each associated with a different second level key component 522. For example, if $M_i$ represents the $i_{th}$ second-level macro-singularity, then $K_i$ represents the associated second key component B 522.

For the third level 516, the biometric descriptors include ridge maps 508 that represent the orientation angle of ridges at a plurality of points. To construct a ridge map, at a plurality of points on an image of an actual or synthetic fingerprint, the angle between the tangent line of the ridge at that location and a base axis is determined. This angle is called the orientation of the ridge at that point. The orientation θ of a ridge is a value between 0 and 179. An example of a ridge orientation is illustrated in FIG. 7.

FIG. 7 illustrates an exemplary base axis 700 and tangent line 702 delineating the ridge orientation θ 704 of a sample ridge 706 at one point in a fingerprint image 708.

Referring back to FIG. 5, a plurality of ridge maps are generated (by means of a mathematical generator function or by using a database of actual fingerprints) based on the core and delta distributions in the second level 514. For example, in an embodiment, the hierarchy 500 includes, e.g. 128 second level macro-singularity distributions 506. Each of the 128 second level macro-singularity distributions 506 are associated with 64 third level ridge maps 508.

FIG. 8 illustrates a schematic block diagram of an embodiment of a ridge map 800. The ridge map 800 includes vectors 802 representing ridge orientations at a plurality of points. The ridge map 800 illustrates a distribution of the core 804 and delta 806.

Referring back to FIG. 5, the third level ridge maps 508 are each associated with a different third key component C 524. For example, if $Ridge Map_i$ represents the $i^{th}$ ridge map, then $K_i$ represents the associated third key component C 524.

The fourth level 518 of the hierarchy 500 includes a plurality of grid patterns 510. To generate a grid pattern, a grid of m*n is used to overlay an area of a ridge map 508, wherein m and n are either system parameters or set specifically for individual users or groups thereof. In an embodiment, a value of 1 is assigned to k cells of the grid that include the highest numbers of minutiae, and a value of 0 is assigned to the remaining cells. If there is a tie (two cells having similar number of minutia), cells are selected based on their order in a spiral starting from the center of the grid, outwards. The m*n grids having k cells with a value of 1 create valid grid patterns. A valid grid pattern is mapped to a vector. Either the grid patterns or the mapped vectors may be used as the fourth level biometric descriptors 510. Valid grid patterns and corresponding vectors are generated in subsets associated with each of the third level ridge maps 508. The fourth level grid patterns 510 are each associated with a different fourth key component D 526. For example, if Grid Pattern represents the ith grid pattern, then $K_i$ represents the associated fourth key component D 526.

Other various methods of selecting cells to generate a grid pattern 510 are possible. For example, cells may be selected based on a number of minutiae that are likely to be robustly read over the course of time. In another example, cells may be selected based on a density of ridges. In yet another example, multiple selection methods are used simultaneously or iteratively to select cells to generate the grid patterns 510 for the fourth level.

FIG. 9 illustrates a schematic block diagram of an example of a grid pattern 900. FIG. 9 illustrates an m*n grid 902 overlaid on a fingerprint image 904. Cells 906 in the grid 902 that are filled meet a specified criteria, such a number of minutiae or quality of minutiae or robustness of minutiae or density of ridges or other type of criteria. The resulting grid pattern is mapped to a vector of binary values. For example, the grid pattern for the 6*8 grid in FIG. 9 is mapped to a vector having 48 binary values, e.g. a "1" for selected cells and a "0" for non-selected cells. In another example case wherein the grid is configured as a 5*6 grid and includes 30 cells, the 30 cells is represented by a 4 byte number. Each of the 4 byte numbers represents one of the possible configurations. Some values in this 4 byte numbers may not represent a valid configuration of a fingerprint. Assuming only ⅓ of the cells out of 30 meet the specified criteria, such as having a sufficient number of minutia, and the average length of the spiral starting from the center is 15, only 15 grid patterns may be valid.

Referring back to FIG. 5, in another embodiment, a fifth level may be added to the hierarchy 500. The biometric descriptors at the fifth level may specify further detail relating to the minutiae in the fourth level biometric descriptors 510. For example, the fifth level biometric descriptors may specify location of pores on ridges.

Once generated, the hierarchy 500 is stored by the cryptographic server. Some of the biometric descriptors, such as the ridge maps are described mathematically. It is sufficient then to store the generator function and parameters which generated the ridge maps. Other biometric descriptors may only include coordinates of points or matrices or vectors which are stored as integer numbers of proper size. Preferably, the hierarchy is pre-generated for a plurality of users, e.g. the hierarchy 500 of biometric descriptors is generated without using the biometric data of the plurality of users or generated prior to user registration.

In use, the fingerprint data 502 is first compared with the fingerprint types 504a-n at the first level 512, and a first fingerprint type 504c is selected as illustrated by the highlighted block. Based on this selected first level fingerprint type 504c, both an associated first key component A 520 and a subset of associated second level distributions 506 of macro-singularities is obtained. The fingerprint data 502 is then compared with the subset of associated second level distributions 506a-n of macro-singularities in the second level 514 and a second level distribution 506b of macro-singularities is selected as illustrated by the highlighted block. Based on this selected second level distribution 506b of macro-singularities, both an associated second key component B 522, and an associated subset of third level ridge maps 508a-n are obtained.

For the third level 516, a ridge map is generated from the fingerprint data and compared with the associated subset of third level ridge maps 508a-n. A third level ridge map 508a is selected and the associated third key component C 526 is obtained. For the fourth level 518, a grid pattern is generated in part from the fingerprint data and the selected third level ridge map 508a as described in more detail herein. The grid pattern is compared with the subset of fourth level grid patterns 510*a-n* associated with the selected third level ridge map 508*a*. A fourth level grid pattern 510*a* is selected, and an associated fourth key component D 526 is obtained.

The four key components A, B, C, D or a subset of the four key components are used to obtain the cryptographic key 528. For example, a cryptographic hash function may be applied to the four key components or to a subset of the four key components to obtain the cryptographic key 128. Other methods may also be employed to obtain the cryptographic key 528 using the key components or a subset thereof.

Figure 10:
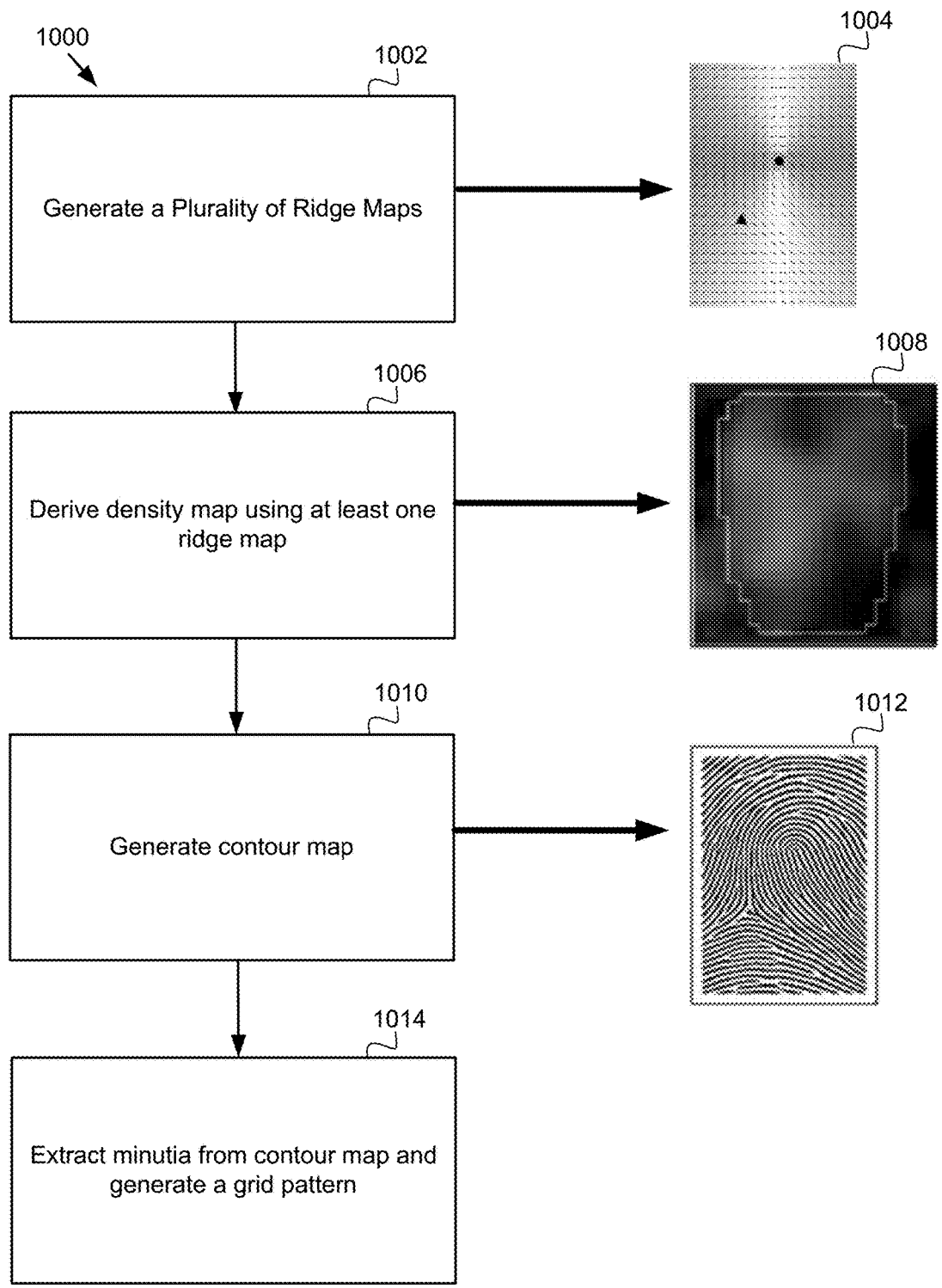
FIG. 10 illustrates a logic flow diagram of an embodiment of a method for generating lower levels of the hierarchy of biometric descriptors.

FIG. 10 illustrates a logic flow diagram of an embodiment of a method for generating lower levels of the hierarchy of biometric descriptors. Various techniques may be employed to generate biometric descriptors for one or more levels of the hierarchy of biometric descriptors. In general, the biometric descriptors may be synthetically generated or generated based on data from actual biometrics. A synthetically generated biometric descriptor is constructed mathematically using one or more functions. In an embodiment, a synthetically generated biometric descriptor is not extracted from actual biometric data.

For example, in an exemplary embodiment, a plurality of ridge maps are synthetically generated 1002. A generator function generates synthetic ridge orientations and is used to generate synthetic ridge maps. An example of a generator function for ridge maps based on the location of deltas ($d_i$) and cores ($c_i$) is given below. This function is parametric and generates several ridge map orientations for a single core and delta setting. An orientation map of ridges can be extracted using the formula below:

$$\theta = \frac{1}{2}\left[\sum_{i=1}^{n_d} g_{ds_i}(\arg(z - ds_i)) - \sum_{i=1}^{n_i} g_{cs_i}(\arg(z - cs_i))\right]$$

$$\{\bar{g}_k(\alpha_i) \mid i = 0, 1, 2, \ldots, L-1\}$$

The function g gives corrected values for orientations at each point computed over a set of $\bar{g}$ values.

$$g_k(\alpha) = \bar{g}_k(\alpha_i) + \frac{\alpha - \alpha_i}{2\pi/L}(\bar{g}_k(a_{i+1}) - \bar{g}_k(\alpha_i))$$

$$\text{for } \alpha_i \le \alpha \le \alpha_{i+1}, \alpha_i = -\pi + \frac{2\pi i}{L}$$

Set $\bar{g}$ as an array of L numbers that are used to generate the ridge orientations. One can create several ridge maps 1004 using several $\bar{g}$ settings applied on a single second level core and delta distribution. As an alternative, it is possible to derive ridge maps from actual fingerprints, or use a combination of synthetically generated ridge maps and ridge maps derived from actual fingerprints. An example of a ridge map 1004 is illustrated in FIG. 10.

To generate grid patterns, a density map is derived using at least one ridge map 1006. For example, a density map is generated by overlaying a m*n grid on the ridge map. The number of ridges in the cells of the grid is counted. A grey-scale is then applied to represent the number of ridges in the cells and obtain the density map. An example of a density map 1008 is illustrated in FIG. 10. Darker sections of the density map 1008 represent a higher density of ridges while lighter sections represent a lower density of ridges.

Next, a contour map is generated 1010. In an exemplary embodiment, a Gabor or similar type function, such as an iterative Gabor filter (e.g., a filter bank consisting of Gabor filters with various scales and rotations), is applied to a ridge map and a density map to derive a contour map. For example, by applying Gabor filters based on the ridge map and the density map at a plurality of points in the ridge map, a contour map is obtained that includes generated ridges. In addition to generated ridges, minutiae points may also be generated in the contour map. This process results in a contour map that includes the minutiae characteristics of an actual fingerprint, such as type of minutiae, location, and orientation. An example of a contour map 1012 is illustrated in FIG. 10.

The minutiae may be extracted from the contour map, and a grid pattern generated 1014. For example, the details of the minutia are extracted by using minutiae templates and template filters. It is possible to obtain a plurality of different contour maps from a same ridge map. For example, by applying different density maps to a same ridge map and using a Gabor function, a plurality of different contour maps may be obtained.

The generated contour maps and their corresponding extracted minutiae may then be used as biometric descriptors, e.g. in the fourth level of a hierarchy. For example, a m*n grid is overlaid on a generated contour map and cells from the grid are selected based on a number of minutiae located in the cells or other criteria. If a specified number k of minutiae are located within a particular cell of the grid (e.g., k=1), then that cell is equal to "1"—otherwise the cell is equal to "0". The grid pattern of "1" and "0"s is mapped to a vector.

Additional levels may be added to the hierarchy using this process by varying the sizes of the grid patterns. For example, for the fourth level, a m*m grid with m=2 is used to obtain a grid pattern. The 2×2 grid is overlaid on a ridge map and the minutiae in each cell are counted. Then, on the next lower level, a grid of increasing size, e.g. a 4×4 grid, is used to obtain grid patterns. Then a 16×16 grid map is used for the next lower level to generate a grid pattern. This process creates increasing detail for each successive level.

Exemplary Cryptographic Key Generation Using Fingerprint Data

Figure 11:
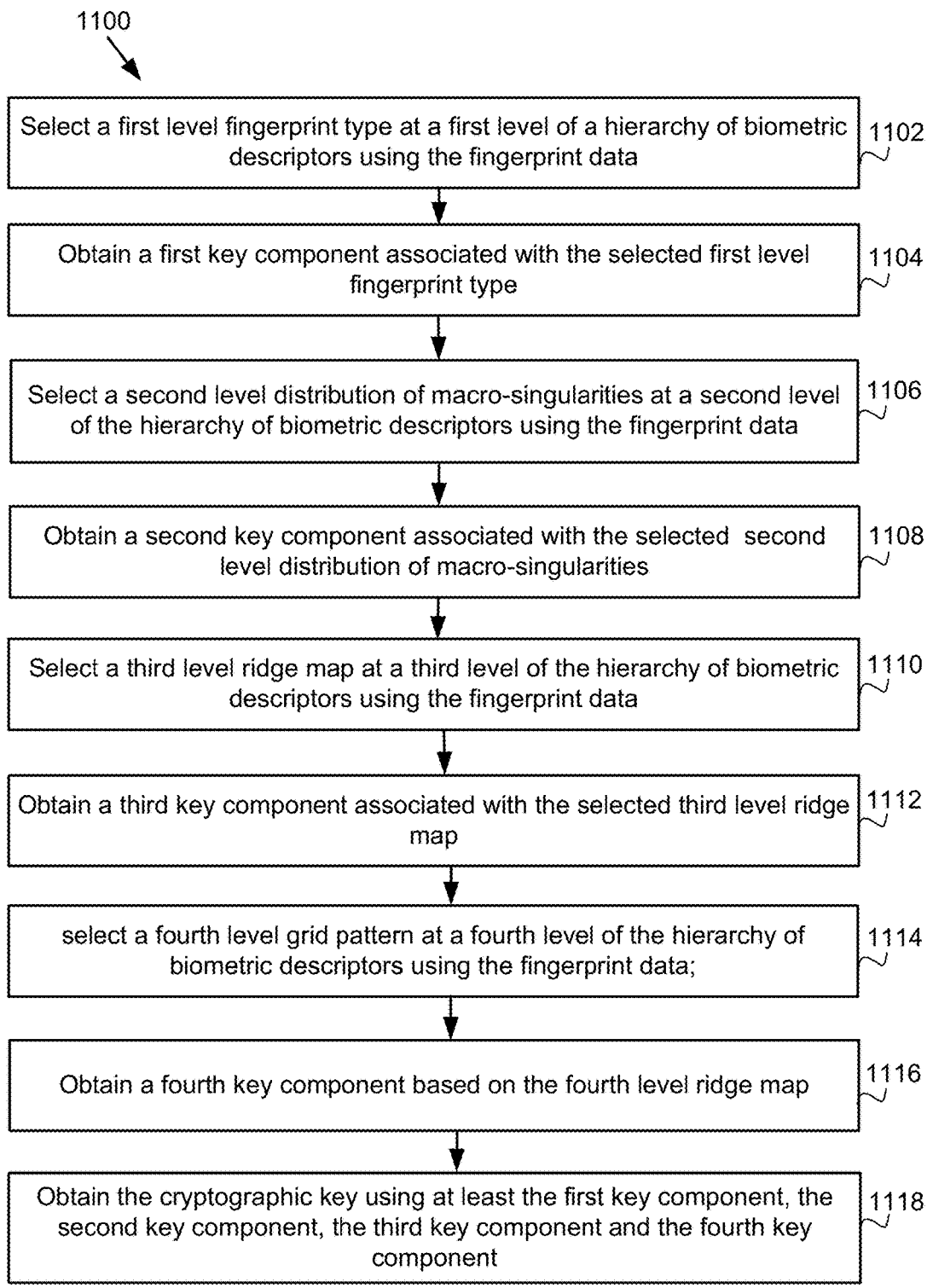
FIG. 11 illustrates a schematic block diagram of an embodiment of a method for key generation using fingerprint data.

FIG. 11 illustrates a schematic block diagram of an embodiment of a method 1100 for key generation using fingerprint data. A first level fingerprint type is selected at a first level of a hierarchy of biometric descriptors using the fingerprint data 1102. A first key component based on the first level fingerprint type is obtained 1104. A second level distribution of macro-singularities is selected 1106. Based at least on this selected second level distribution of macro-singularities, an associated second key component is obtained 1108. A third level ridge map is selected at a third level of the hierarchy of biometric descriptors using the fingerprint data 1110. An third key component is obtained 1112. A fourth level grid pattern is selected at the fourth level of the hierarchy of biometric descriptors using the fingerprint data 1114. A fourth key component associated with the selected fourth level ridge map is obtained 1116. The four key components are then used to obtain the cryptographic key.

Figure 12:
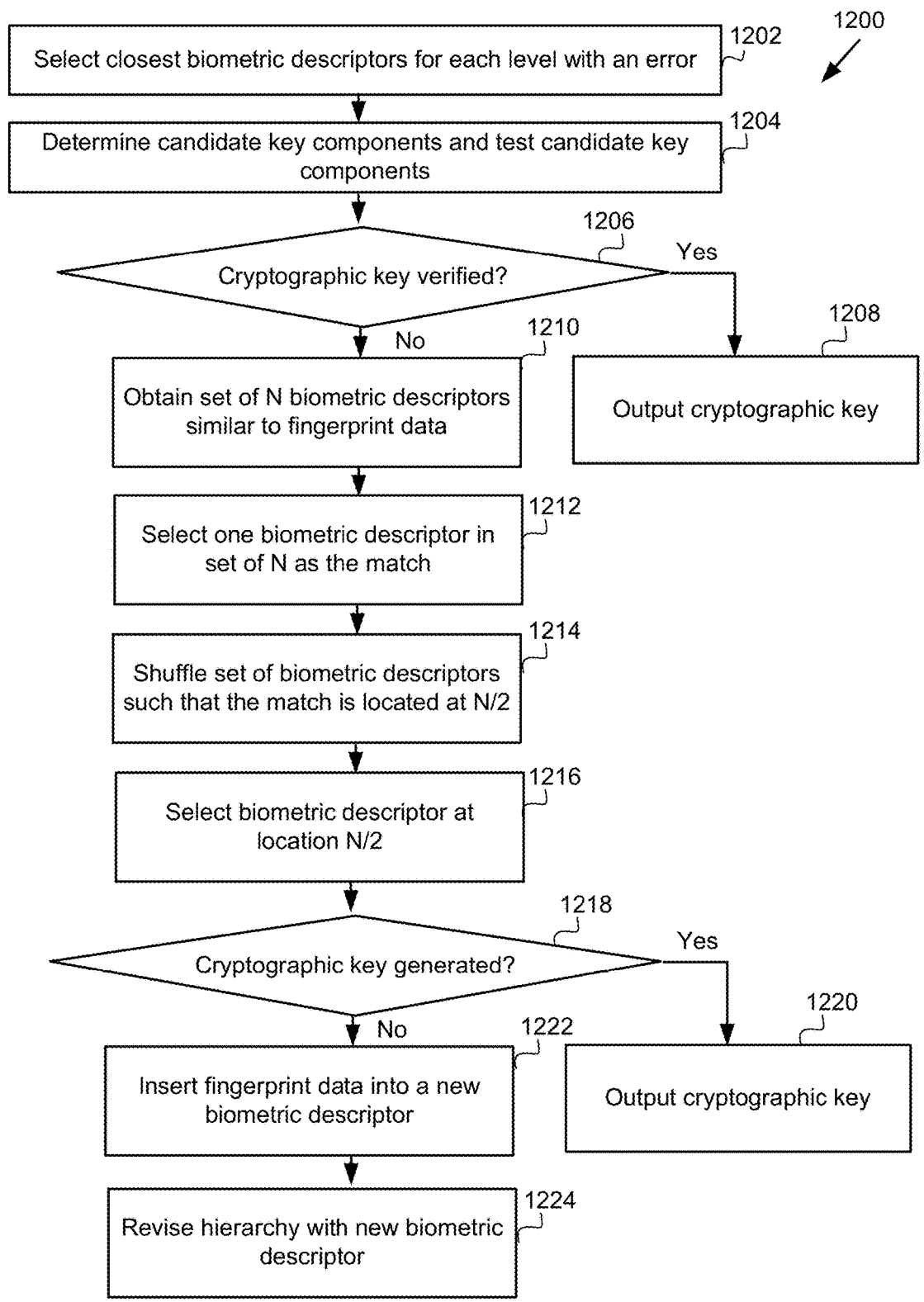
FIG. 12 illustrates a logical flow diagram of an embodiment of an assertion process for generation of a cryptographic key.

FIG. 12 illustrates a logical flow diagram of an embodiment of an assertion process for generation of a cryptographic key. In the absence of matching at a level, the closest biometric descriptors at that level are selected 1202. This results in several candidate key components as alternative possibilities. The candidate key components are ordered, preferably in terms of likelihood of being correct, and tested 1204. The most likely combination of key candidates is tested and if not successful, then the second most likely combination of key components is tested, and so on, until the least likely but still possible combination of the key components has been considered.

In another embodiment to test the candidate key components 1204, each candidate key component is assigned an offset to a modified polynomial point. By combining the known key components with the modified polynomial point, a polynomial point is computed. After computing a sufficient number of such polynomial points, these are interpolated, resulting in a candidate cryptographic key. A method for computing a polynomial point from a stored modified polynomial point and an offset is described in "*Cryptographic approaches to privacy in forensic DNA databases*," by P. Bohannon, M. Jakobsson, and S. Srikwan, published in Public Key Cryptography: Lecture Notes in Computer Science. Volume 1751, pp. 373-390 (2000), which is incorporated by reference herein.

When the candidate cryptographic key is a symmetric key, then the candidate cryptographic key is tested by decrypting at least one stored ciphertext to verify the result. For an asymmetric or public key cryptologic method, the candidate cryptographic key is verified by decrypting a ciphertext encrypted with the corresponding public key or by computing the corresponding public key and comparing it to the stored public key. If the candidate cryptographic key is successfully verified 1206, then the candidate cryptographic key is output as the cryptographic key 1208.

In some cases, a large number (N) of biometric descriptors are relatively similar to the fingerprint data. This problem leads to difficulty in generating a same cryptographic key because a different one of the N relatively similar biometric descriptors may be selected each time key extraction is performed.

To help alleviate this problem, biometric descriptors at levels in the hierarchy with an error may be reordered to assist in the selection of the same biometric descriptor at that level. In an exemplary embodiment, a set of N biometric descriptors that are similar to the fingerprint data is obtained 1210. One of the biometric descriptors from this set that is most similar to the actual fingerprint data is selected and called the "Match" 1212. The set of N biometric descriptors are re-ordered such that the "Match" falls in a location N/2 among the set of N biometric descriptors 1214. The revised hierarchy is saved and transmitted to the cryptographic server with an updated version identifier for use thereafter. During subsequent key extractions, the most similar biometric descriptor at location N/2 is selected 1216.

In cases where a selection is still not found, at least the biometric descriptors at locations N/2 and N/2+1 and N/2+2 should be selected as candidates for testing. Using this approach, the closest match is in the location N/2 (in the middle of N closest biometric descriptors), so the probability of selecting the correct biometric descriptor increases. The approach is stable even in instances of numerous biometric descriptors similar to the actual fingerprint data because the closest match is located at N/2 in middle of the other close candidates. If the candidate cryptographic key is successfully verified 1218 after this approach, then the candidate cryptographic key is output as the cryptographic key 1220.

In some cases, no biometric descriptors in a level are sufficiently similar to the fingerprint data to select a candidate key component. In other cases, none of the candidate cryptographic keys are verified. In cases such as these, actual fingerprint data is inserted into a biometric descriptor. For example, when an error occurs in selection of a biometric descriptor at a level, the device generates a new set of biometric descriptors for the level or at least a new subset associated with one of the biometric descriptors at a higher level. At least one of the new biometric descriptors includes actual fingerprint data associated with the user identifier. The hierarchy for the associated identifier is revised with the new set or subset of biometric descriptors 1224, and a version identifier of the hierarchy is updated. The updated version of the hierarchy and the user identifier is transmitted to the cryptographic server. The updated version of the hierarchy is then used thereafter for the associated user identifier. The fingerprint data and actual biometric descriptor based on the actual fingerprint data is erased from the local device to prevent unauthorized access. This approach of inserting actual fingerprint data ensures that there is a biometric descriptor at each level that matches the actual fingerprint data for that user. This approach of inserting actual fingerprint data may be used in conjunction with or in lieu of the previous described method of re-ordering biometric descriptors.

Figure 13:
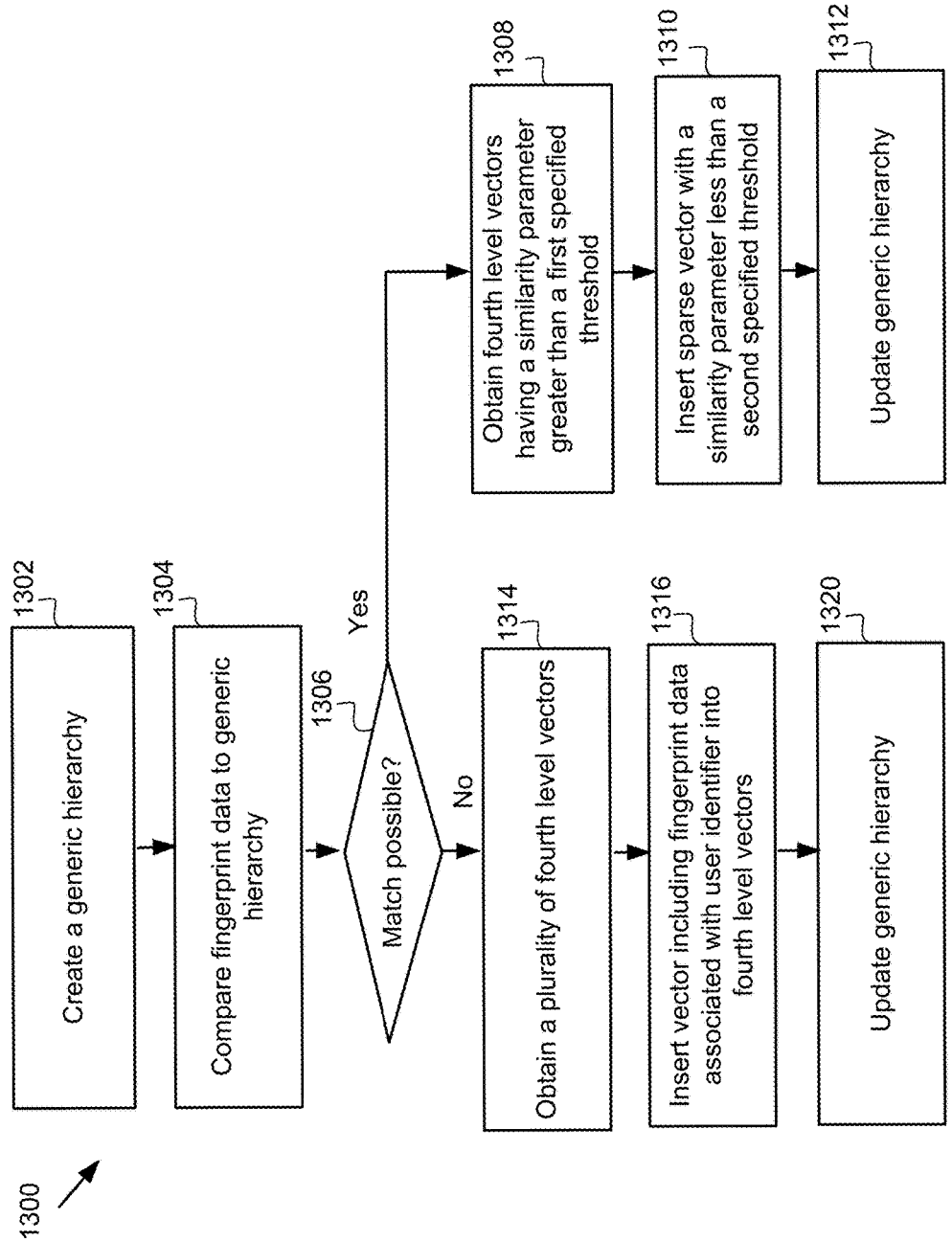
FIG. 13 illustrates a logic flow diagram of an embodiment of a method for generating a user-specific hierarchy.

FIG. 13 illustrates a logic flow diagram of an embodiment of a method 1300 for generating a user-specific hierarchy. In an embodiment, fingerprint data for a user is included in biometric descriptors in the hierarchy to generate a user-specific hierarchy.

In this exemplary embodiment, a pre-generated generic hierarchy is first created 1302. The first two levels of the generic hierarchy are comprised of the biometric descriptors described above, e.g. the types of fingerprints and distribution of the delta and core. To create the third level of the generic hierarchy, a plurality of ridge maps are overlaid with an m*n grid. The cells of the grid are preferably sized such that a single minutia may fit within one cell but unlikely that two minutia would fall inside any one cell. If a minutia is located within a particular cell of the grid, then that cell is equal to "1"—otherwise the cell is equal to "0". Grid patterns are then determined, and vectors mapped to the grid patterns. This process results in a plurality of generic grid patterns and corresponding generic vectors. Other criteria may be used to select cells to generate the grid patterns, e.g. number of minutiae in a cell, density of ridges, etc.

The generic grid patterns are then compared with probability data extracted from actual fingerprints. For example, density maps of minutiae are generated based on a database of actual fingerprints and compared to the generic grid patterns. A probability distribution of minutia points is generated based on the database of actual fingerprints. The generic grid patterns are then assigned a distribution of probabilities based on the actual fingerprint data. Some generic grid patterns may be discarded that fall outside a threshold of probability. Other characteristics of actual fingerprints may also be considered and used as constraints to generate the generic grid patterns. The generic grid patterns are mapped to generic vectors. The generic grid patterns and/or generic vectors are then inserted in the generic hierarchy as the biometric descriptors in the fourth level.

The generic hierarchy is used as a starting point in generation of a cryptographic key for a user. Fingerprint data for a set of fingerprints of the user is obtained. A grid pattern of minutiae is derived from a ridge map of a first fingerprint in the set of fingerprints, and the fingerprint grid pattern is mapped to a fingerprint vector. The fingerprint vector is compared with the plurality of generic vectors in the fourth level of the generic hierarchy 1304, and it is determined whether one of the generic grid patterns is a possible match 1306.

When a match is possible, the generic vector that it is a possible match with the fingerprint vector is designated as a sparse vector. The sparse vector may either be an exact match or within a first similarity parameter to the fingerprint vector based on the fingerprint grid pattern. For example, when the similarity parameter includes a hamming distance, the sparse vector may then have a minimum hamming distance within a first specified threshold (for example min_ham is equal to or less than 2) from the fingerprint vector. Other types of similarity parameters may be used or other ways to measure similarities between the fingerprint data and the biometric descriptors may be employed.

A plurality of fourth level grid patterns and corresponding fourth level vectors are then obtained from the generic hierarchy according to the probability distribution of the vectors. The sparse vector is compared to the plurality of fourth level vectors, and a similarity parameter is calculated for each comparison. Based on the similarity parameter, fourth level vectors that are different from the sparse vector are selected. In an exemplary embodiment, fourth level vectors (or the subset of the fourth level vectors associated with the selected third level grid pattern) having a similarity parameter greater than a second specified threshold from the sparse vector are selected 1308. For example, the similarity parameter may include a hamming distance, and synthetic vectors having a minimum hamming distance within a threshold (for example min_ham is equal to or greater than 5) are selected. This process ensures that the sparse vector is sufficiently different from the other fourth level vectors (or the subset of the fourth level vectors associated with the selected third level grid pattern) to be robustly selected during key extraction. Alternatively or in addition to this process, only fourth level vectors (or the subset of the fourth level vectors associated with the selected third level grid pattern) that are within a minimum hamming distance of each other are selected. For example, the fourth level vectors having a hamming distance equal to or less than 5 from each other are selected. Thus, the selected fourth level vectors are sufficiently similar to each other that the sparse vector is differentiated. In an exemplary embodiment, the sparse vector has a similarity parameter that indicates a greater similarity to the biometric data than the other selected fourth level vectors (or the other fourth level vectors in the subset associated with the selected third level grid pattern).

After a predetermined number of the fourth level vectors are selected, the sparse vector is inserted into the selected fourth level vectors 1310, and their order is randomized. The generic hierarchy is then updated to include the sparse vector and selected fourth level vectors as biometric descriptors in the fourth level 1312. The cryptographic key may then be generated as described herein using the updated hierarchy. Though this process is described with respect to the biometric descriptors at the fourth level, a similar process may be performed at other levels, e.g. the third level ridge maps or any biometric descriptors at a fifth or lower level. For example, one or more levels of the hierarchy may be updated to include a biometric descriptor that has a similarity parameter that indicates a greater similarity to the biometric data than the other biometric descriptors at the level.

The updated hierarchy is assigned an updated version number and stored as part of the biometric lock information for the user. The updated hierarchy and version number and the associated user identifier are transmitted to the cryptographic server. The cryptographic server receives updated hierarchy and version number and the associated user identifier. The cryptographic server stores the updated hierarchy and version number as biometric lock information associated with the user identifier. When a request for generation of a cryptographic key is received with the user identifier from a client device, the cryptographic server transmits the updated hierarchy associated with the user identifier to the client device.

When a match is not possible 1306, a vector derived from the fingerprint data associated with the user may be inserted into the hierarchy. Similarly as described above, a plurality of fourth level grid patterns or corresponding fourth level vectors are obtained 1314. A grid pattern of minutiae is obtained from the actual fingerprint data associated with the user's identifier. A vector is derived from this grid pattern and inserted into the fourth level grid patterns 1316 (e.g., within the subset of the fourth level vectors associated with the selected third level grid pattern). Thus, the hierarchy is updated to include at least one biometric descriptor based on the biometric data associated with the user identifier.

The fourth level of the generic hierarchy is revised to include the vector based on the fingerprint data associated with the user 1320. A version identifier of the hierarchy is updated. The updated version of the hierarchy, the updated version identifier and the user identifier is transmitted to the cryptographic server. The updated version of the hierarchy is then stored by the cryptographic server and used thereafter for the associated user identifier. The fingerprint data and actual vector based on the actual fingerprint data is erased from the local device to prevent unauthorized access.

This approach of inserting actual fingerprint data ensures that there is a vector that matches the actual fingerprint data at the fourth level of the hierarchy. In addition, the approach helps to accelerate the process of matching biometric descriptors in the fourth level of the hierarchy to the fingerprint data. Though this process is described with respect to the biometric descriptors at the fourth level, a similar process may be performed at other levels, e.g. the third level ridge maps or any biometric descriptors at a fifth or lower level. For example, one or more levels of the hierarchy may be updated to include a biometric descriptor based on a user's fingerprint data. In addition, this process of inserting a biometric descriptor based on a user's fingerprint data into a level may be performed along with the other process described herein. For example, other biometric descriptors in the level may be selected to have a similarity parameter greater than a specified threshold from the biometric descriptor based on the user's fingerprint data.

Preferably, key generation is performed initially and is not repeated for the same user. Once a cryptographic key is initially generated from the fingerprint data, in some cases, a public key may also be generated from the cryptographic key. Thus, the public key is generated or based at least in part on the key components or subset thereof. The public key and biometric lock information is transmitted to the cryptographic server 410. The cryptographic server 410 stores the public key and biometric lock information as well as any updated versions of the hierarchy of biometric descriptors with the associated user identifier.

Key recovery is performed after key generation when a user needs to encrypt or decrypt a message or perform authentication using the cryptographic key. Key recovery is similar to the process of key generation in some embodiments.

Figure 14:
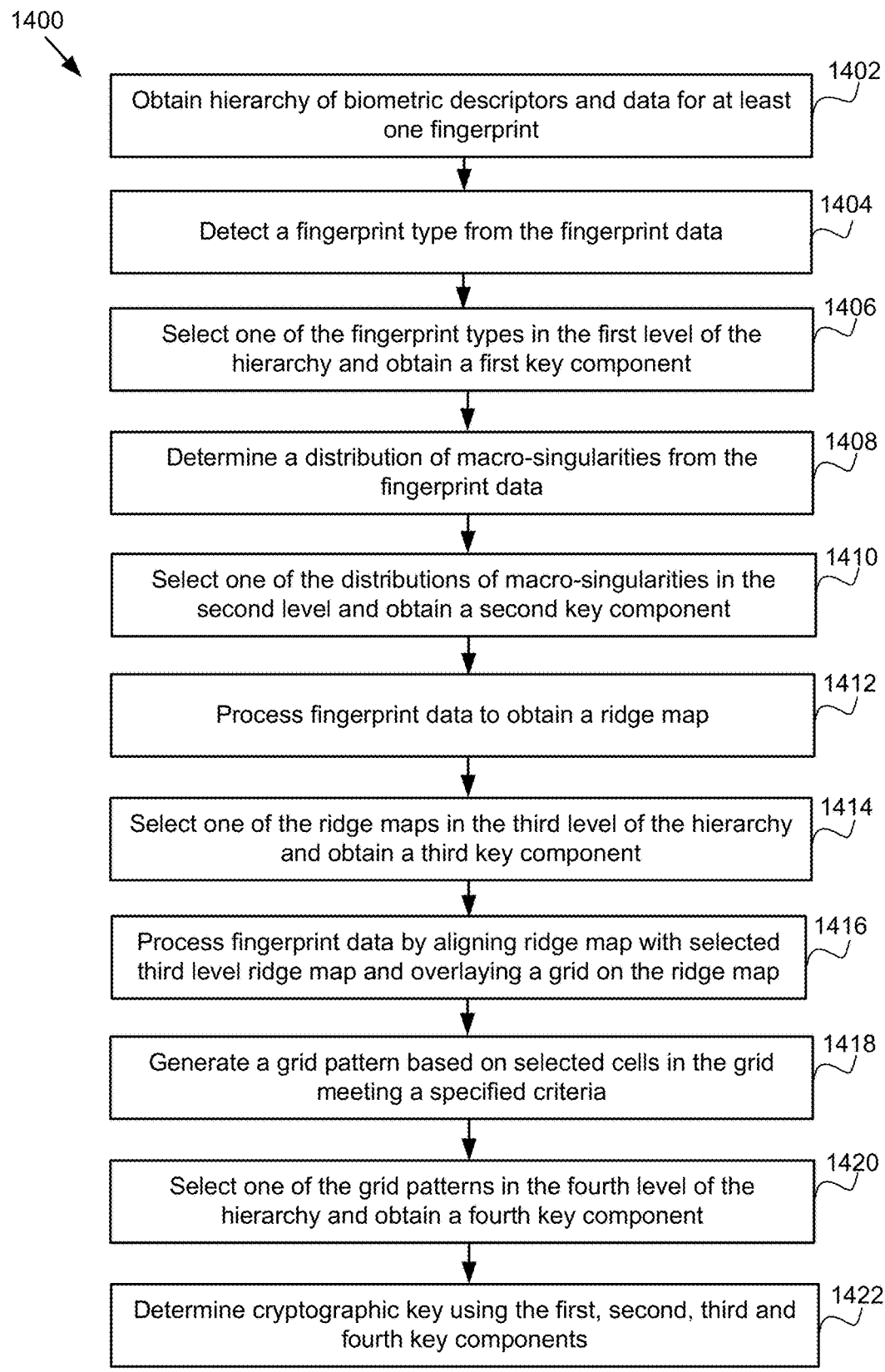
FIG. 14 illustrates a logic flow diagram of an embodiment of a method for recovery of a cryptographic key using at least one fingerprint.

FIG. 14 illustrates a logic flow diagram of an embodiment of a method 1400 for recovery of a cryptographic key using at least one fingerprint. The hierarchy of biometric descriptors and data for at least one fingerprint is obtained 1402. In one example, the hierarchy is downloaded from the cryptographic server in a compressed format. The compressed format may decrease download time but the device then needs to extract the data of the hierarchy. Alternatively, a complete descriptive version of the hierarchy may be downloaded requiring less processing by the device but longer download time. In another alternative, a private information retrieval (PIR) system may interactively query the cryptographic server to download the hierarchy, in order to limit the amount of information that has to be transferred without affecting the security of the information.

After or in parallel with obtaining the hierarchy, data for at least one fingerprint of the user is obtained, e.g. by scanning or imaging the fingerprint. The fingerprint data includes at least one image of the fingerprint or multiple images of the fingerprint or other information that provides a location of the macro-singularities and minutiae in the fingerprint.

For the first level of the hierarchy, fingerprint features are detected from the fingerprint data to determine a type of fingerprint 1404. For example, a fingerprint image is processed to determine a number and location of any cores and deltas. The type of fingerprint is then determined based on the number and location of any detected cores and deltas. The determined fingerprint type is then compared with the six different types in the first level of the hierarchy. Based on the comparison, one of the six fingerprint types is selected and a first key component associated with the selected fingerprint type is obtained 1406.

For the second level of the hierarchy, the distribution of the delta and core in the fingerprint data is detected from the fingerprint data 1408. For example, the position and the location of the core and delta are obtained from the fingerprint data. This information may include vectors of the distance and angle between the detected cores and deltas or between a base axis. This information is then compared with the subset of delta and core distributions in the second level associated with the selected fingerprint type. Based on this comparison, one of the core and delta distributions in the subset is selected and the associated second key component is obtained 1410.

For the third level of the hierarchy, a ridge map is obtained by processing the fingerprint data to determine the orientation of the ridges at a plurality of points 1412. The ridge map is compared to the subset of third level ridge maps in the hierarchy associated with the selected core and delta distribution. Based on this comparison, one of the third level ridge maps in the subset is selected and the associated third key component "s" is obtained 1414.

For the fourth level of the hierarchy, the fingerprint data is processed to determine a grid pattern of minutia 1416. First, the ridge map derived from the fingerprint data is aligned with the selected third level ridge map. The ridge map derived from the fingerprint data is rotated and translated until its ridge orientations align with the selected third level ridge map. Various minutiae are then located on the aligned ridge map. These minutiae may include, e.g., ridge ending, ridge bifurcation, island ridge, dot or very short ridge, bridge, spur, eye, double bifurcation and trifurcation. A predefined m*n grid is then overlaid onto an area of the aligned ridge map.

Cells meeting a specified criteria are selected in the grid to generate a grid pattern 1418. In one example, a number of minutia in each cell of the overlaid grid is counted and a K number of cells with maximum number of minutia are selected, wherein K is a parameter (e.g., such as K=8). When two cells have a same number of minutiae, then the cells may be selected based on their order of appearance on a spiral starting from the center of the fingerprint area and rotating outward. The grid pattern of selected cells is then compared to the grid patterns in the fourth level of the hierarchy. In an embodiment, the grid pattern is mapped to a vector having a hamming weight x. This mapped vector is then compared to vectors generated from the fourth level grid patterns. The fourth level vector that corresponds closest to, e.g. has the smallest hamming distance from, the mapped vector is selected. The index of the selected fourth level vector, i.e., its location in the sequence of vectors, is the "vector number" and is used to obtain the fourth key component 1420.

The four key components or a subset thereof are then used to obtain the cryptographic key 1422. In an exemplary embodiment, the first key component provides 2 bits of entropy, the second key component provides 7 bits of entropy, the third key component provides 6 bits of entropy, and the fourth key component provides 10 bits of entropy. The cryptographic key thus has 25 bits of entropy. By performing this process for two fingers, a total of 50 bits of entropy is generated. Furthermore, since no one biometric descriptor in the hierarchy is a template or match for all the fingerprint data, it is not possible for an unauthorized user with access to the hierarchy and biometric lock information to determine which biometric descriptors correspond to the user or which biometric descriptors may correspond to another user or are synthetically generated. Security of the biometric data of a user is thus increased over other methods that store a single template that corresponds to a user's fingerprint data.

Figure 15:
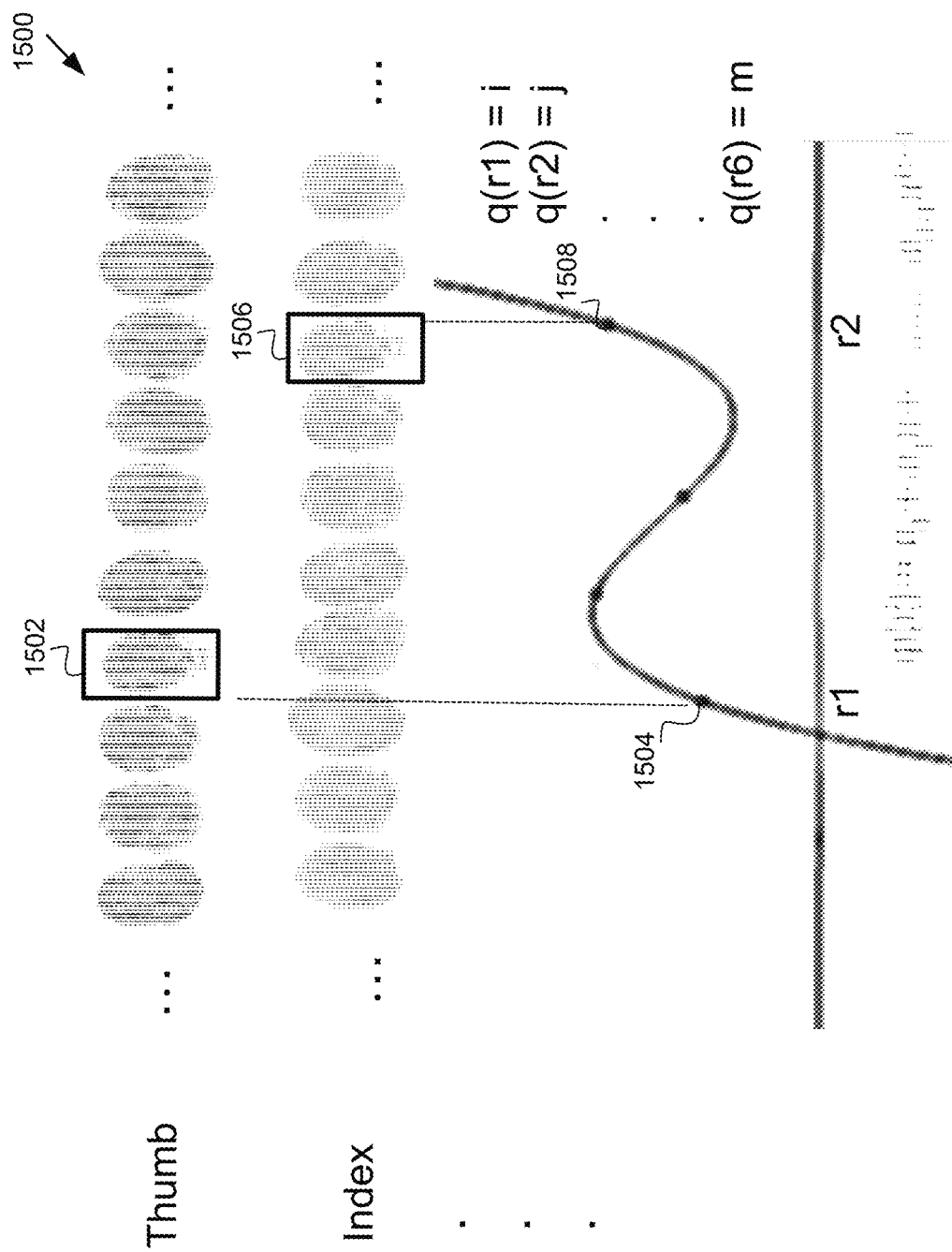
FIG. 15 illustrates a schematic block diagram of an embodiment of a method for generation of a cryptographic key using different subsets of fingerprints.

FIG. 15 illustrates a schematic block diagram of an embodiment of a method 1500 for generation of a cryptographic key using different subsets of fingerprints. In this embodiment, a polynomial interpolation method is used to obtain the cryptographic key. After a quorum of polynomial points is obtained, combinations of polynomial points are interpolated, using a method such as that described in the article, "How to share a secret" by A. Shamir and published in *Communications of the ACM* 22 (1): pages 612-613, which is incorporated by reference herein. This method is based on a k number of points to define a polynomial of degree k−1. Using k−1 positive integers $a_1, \ldots, a_{k-1}$, a polynomial can be defined as:

$$f(x)=a_0+a_1x+a_2x^2+a_3x^3+\ldots+a_{k-1}.$$

The polynomial may be interpolated with any n points, for instance set i=1, . . . n to retrieve (i, f(i)). Given any subset of k of these pairs, the coefficients of the polynomial can be obtained using interpolation. The cryptographic key is set as the constant term $a_0$. To determine the polynomial, n points are defined by N key components corresponding to N fingerprints. For example, a fingerprint of a thumb 1502 is used as the fingerprint data to generate key components to determine a first polynomial point 1504. A fingerprint of an index finger j is used as fingerprint data to generate key components to determine a second polynomial point 1508. After a quorum of polynomial points is obtained, the combinations of the polynomial points are interpolated to obtain the coefficients of the polynomial f(x).

Figure 16:
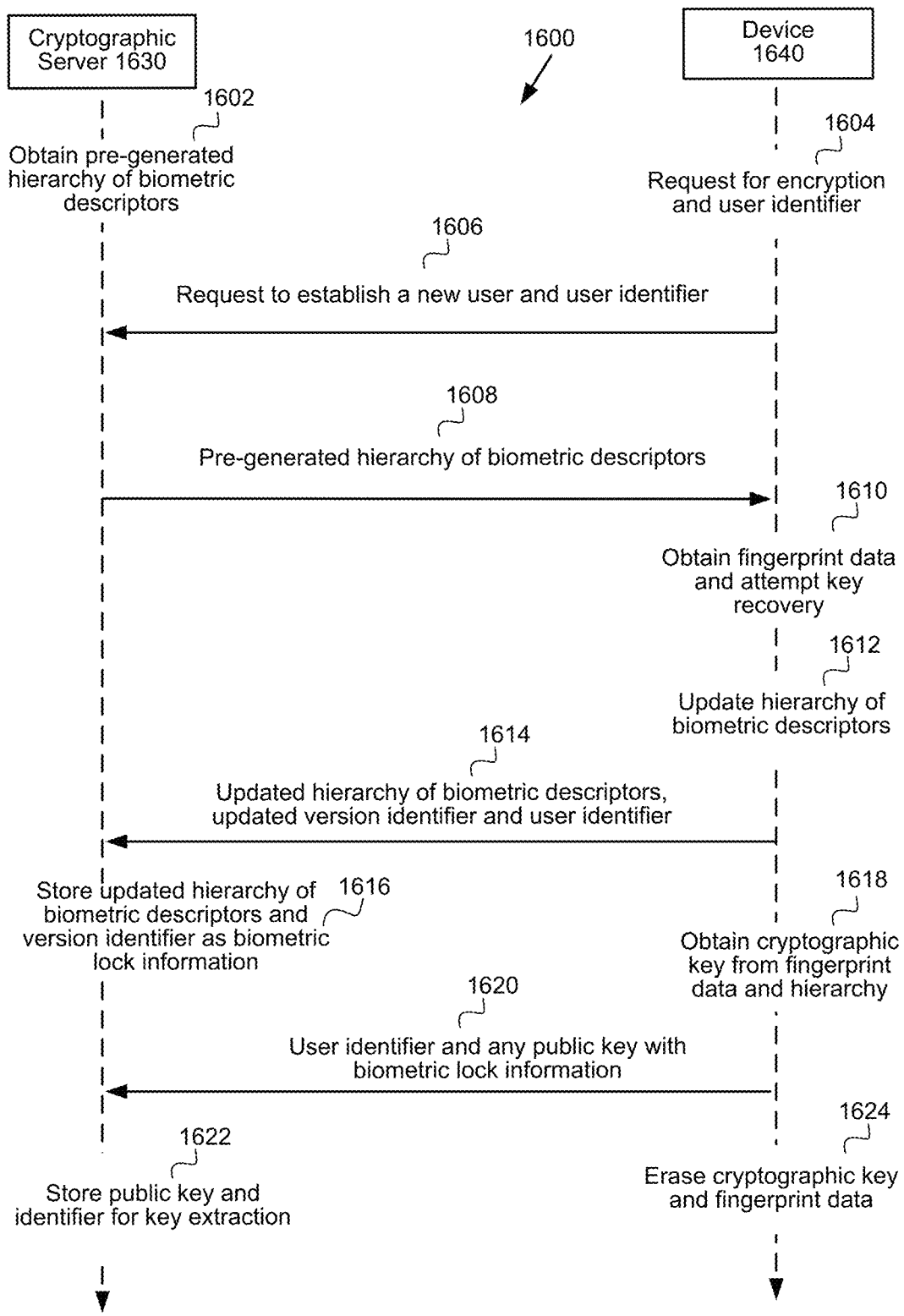
FIG. 16 illustrates a logical flow diagram of an embodiment of a method for key recovery in an encryption service.

FIG. 16 illustrates a logical flow diagram of an embodiment of a method 1600 for key generation. According to one exemplary implementation, the cryptographic server 1630 provides an encryption service for a plurality of client devices 1640. As part of the encryption service, the cryptographic server 1630 obtains a pre-generated hierarchy of biometric descriptors 1602. The pre-generated hierarchy is used by the plurality of client devices for generating a cryptographic key associated with a user identifier. In an embodiment, the pre-generated hierarchy of biometric descriptors 1922 is generated without using the biometric data of the plurality of users. In general, the biometric descriptors may be generated based on data from actual biometrics randomly collected or synthetically generated.

A device 1640 receives a request from a user for encryption and a user identifier 1604. When the user has not previously registered with the encryption service, the device 1640 transmits a request to establish a new registered user with an associated user identifier 1606. The cryptographic server 1630 transmits the pre-generated hierarchy of biometric descriptors to the device 1640 for generation of a cryptographic key 1608. The device 1640 obtains fingerprint data from the user and attempts key recovery using the pre-generated hierarchy of biometric descriptors as described herein.

The device 1640 may update the pre-generated hierarchy of biometric descriptors by inserting biometric descriptors at one or more levels of the hierarchy or re-ordering one or more biometric descriptors in a level or performing other modifications to assist in cryptographic key generation as described herein. The device transmits any updated hierarchy with the updated version number and user identifier to the cryptographic server 1614, and the cryptographic server 1630 stores the updated hierarchy with its updated version identifier as biometric lock information associated with the user identifier 1616. The updated version of the hierarchy is used thereafter for encryption requests associated with the user identifier. However, the pre-generated hierarchy of biometric descriptors is continued to be transmitted for use by new users or others of the plurality of users not having an associated updated hierarchy.

The device 1640 proceeds to obtain the cryptographic key using the fingerprint data and the updated hierarchy using key generation methods as described herein 1618. When the encryption service is a public key cryptosystem, the device 1640 determines the public key using the cryptographic key. The device 1640 transmits the public key and associated user identifier to the cryptographic server 1630. The cryptographic server stores the public key as part of the biometric lock information associated with the user identifier, wherein the public key is based at least in part on key components or subset thereof as described herein 1622. The device 1640 erases the cryptographic key and fingerprint data to protect against unauthorized access to the information 1624.

Figure 17:
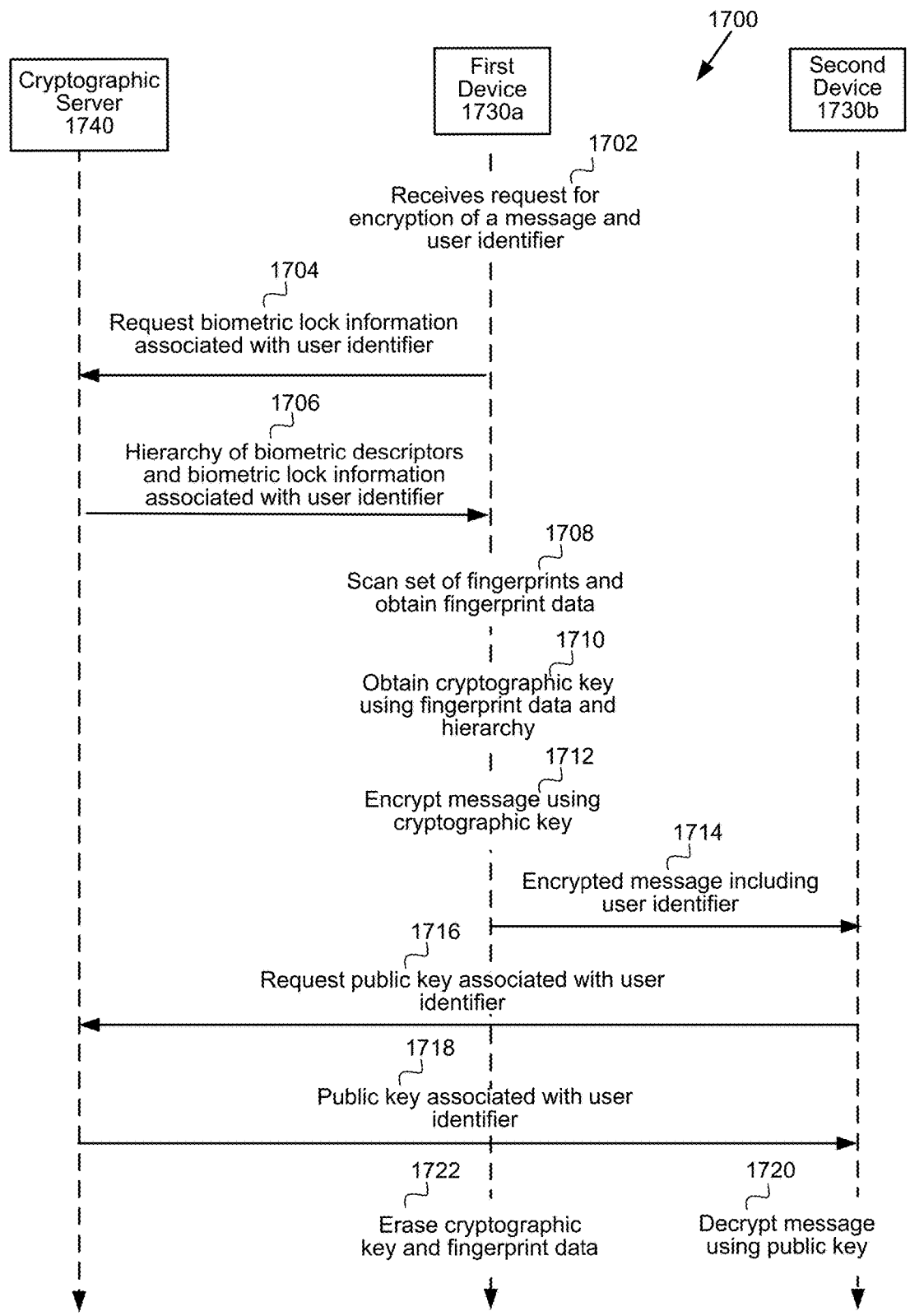
FIG. 17 illustrates a logical flow diagram of an embodiment of a method for providing an encryption service.

FIG. 17 illustrates a logical flow diagram of an embodiment of a method 1700 for providing an encryption service to a plurality of devices 1730. A first user device 1730a receives a request for encryption of a message and a user identifier 1702. The first device 1730a transmits a request for biometric lock information associated with the user to the cryptographic server 1740, including the user identifier 1704. The cryptographic server 1740 responds with the biometric lock information and the pre-generated hierarchy of biometric descriptors or an updated version of the hierarchy of biometric descriptors associated with the user identifier for generation of a cryptographic key 1706. The biometric lock information may include an identifier of set of fingerprints needed to generate the cryptographic key, version of the hierarchy, and other configuration information. The first device 1730a scans the set of fingerprints and obtains fingerprint data 1708 and proceeds to obtain the cryptographic key with the fingerprint data and the hierarchy, e.g. using an embodiment as described herein 1710. The device 1730a then encrypts a message using the cryptographic key 1712. The device 1730a transmits the encrypted message and user identifier to a requested destination 1714, such as the device 1730b. The device 1730b receives the encrypted message and requests the public key associated with the user identifier 1716. The cryptographic server 1740 receives the request and responds with the public key associated with the user identifier 1718. The device 1730b is now operable to decrypt the message using the public key 1720. When the encryption session is completed, the device 1730a erases the cryptographic key and the fingerprint data. This action protects against unauthorized access to the biometric information and the cryptographic key.

Exemplary Device and Cryptographic Server in More Detail

Figure 18:
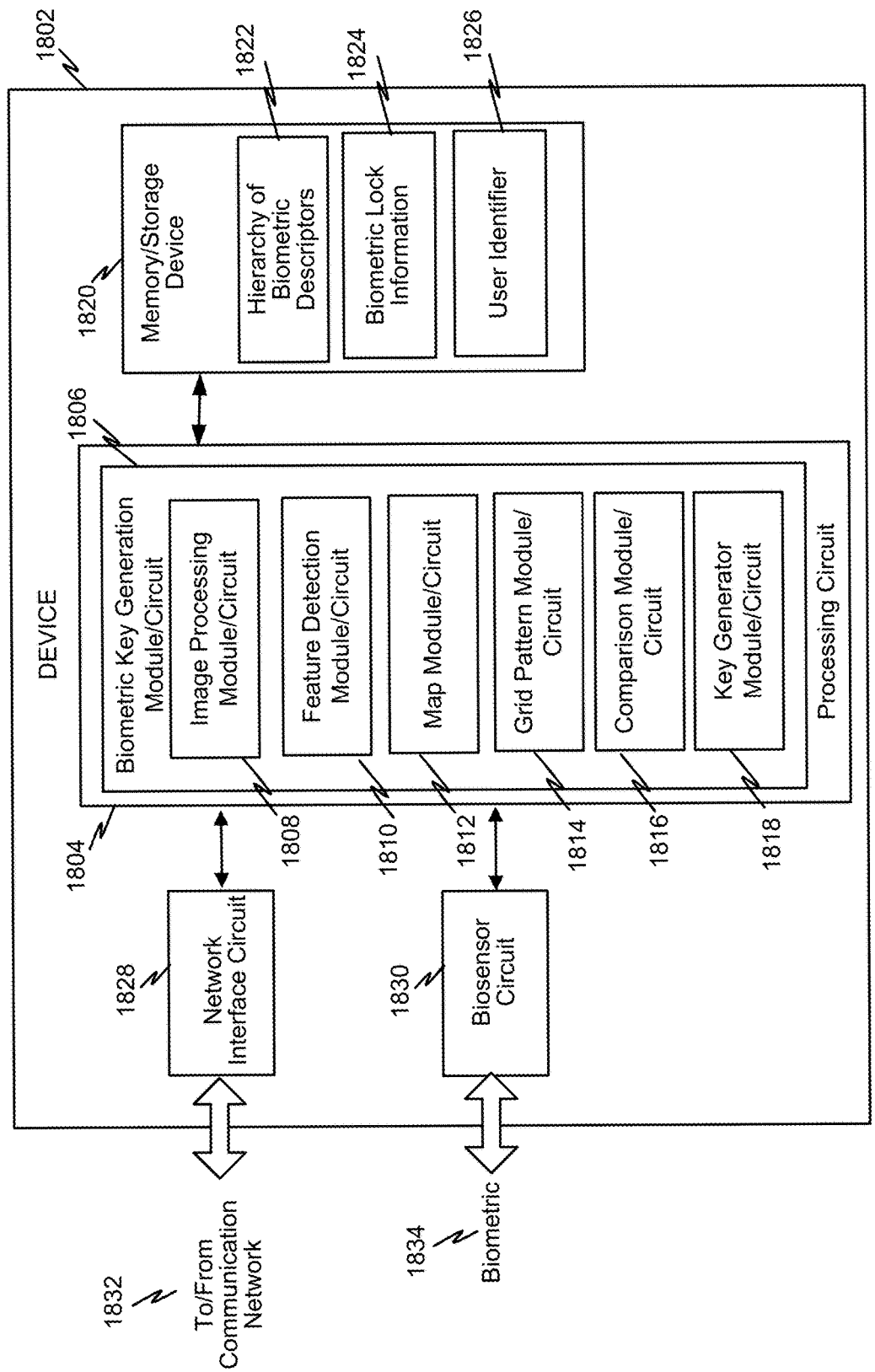
FIG. 18 illustrates a schematic block diagram of an embodiment of a device configured for cryptographic key generation using biometric data.

FIG. 18 illustrates a schematic block diagram of an embodiment of a device 1802 configured for cryptographic key generation using biometric data. The processing circuit 1804 of the device 1802 includes a biometric key generation module/circuit 1806. Various modules and functions of the biometric key generation module/circuit 1806 include an image processing module/circuit 1808, a feature detection module/circuit 1810, a map module/circuit 1812, a grid pattern module/circuit 1814, a comparison module/circuit 1816 and a key generator module/circuit 1818. Though the various modules are shown as separate modules, one or more of the functions of the modules may be combined into another module or functions further segmented into additional modules. In addition, the modules may be integrated into one or more devices or may be separate devices. Additional modules or other components may also be included in the device 1802 to perform the functionality described herein.

The image processing module/circuit 1808 obtains one or more images of a fingerprint from a set of scanned fingerprints. The image processing module/circuit 1808 may align the image with other images of the fingerprint, crop the image, filter the image, or perform other processing. In an embodiment, a surface map of the fingerprint is generated that includes a plurality of two dimensional (2D) coordinates. The 2D coordinates include for example Cartesian (x, y) coordinates, spherical (r, $\theta$) coordinates or cylindrical (y, r) coordinates. The 2D coordinates may be in reference to a base axis defined in the fingerprint images or other defined reference plane. Each of the 2D points in the surface map may include texture data. For example, texture data includes color information such as RGB values or a brightness value or a grey scale.

The feature detection module/circuit 1810 processes the surface map of the fingerprint to detect one or more features. For example, features of a fingerprint include arches, cores, deltas, whorls, or other patterns of ridges as well as minutiae points. Minutiae points are local ridge characteristics that include, e.g. e.g., ridge ending, ridge bifurcation, island ridge, dot or very short ridge, bridge, spur, eye, double bifurcation and trifurcation. Other types of features, such as pores or scars, on the surface map may also be detected. In an embodiment, the feature detection module/circuit 1810 accesses feature templates or vectors that represent the various features of a fingerprint. The feature detection module/circuit 1810 compares a subset of the surface map with a feature vector. Matched filters, correlation filters, Gabor filters (with Gabor wavelets, log-Gabor wavelets) and Fourier transforms can be used to perform the comparison between the feature vector and subset. Based on the comparison, the feature detection module/circuit 1810 determines the presence, type and location of features in the fingerprint. Based on the features detected and their relative position, the feature detection module/circuit 1810 is operable to determine a fingerprint type, such as arch, tented arch, left loop, right loop, a plain whorl and a double whorl.

The feature detection module/circuit 1810 outputs the feature data for the surface map. The feature data includes a list of features with 2D coordinates and type of feature. In an embodiment, the feature data further includes relative placement of the features with respect to other features. For example, it may include a distance or number of ridgelines between features. The feature data may further include an orientation angle of a feature. When a feature includes a vector or gradient vector, the feature data includes vector coordinates, such as orientation angle of the vector and value for the vector.

The map module/circuit 1812 is operable to derive a ridge map, density map and contour map from the surface map of the fingerprint or from a synthetic ridge map, as described herein. The grid pattern module is operable to overlay an m*n grid over the surface map or ridge map and determine specified criteria, such as number of minutiae or ridges, about the cells of the grid. The grid pattern module/circuit 1814 is operable to generate a grid pattern and map the grid pattern into vectors, as described herein. The comparison module/circuit 1816 is operable to compare the fingerprint data to the biometric descriptors in the hierarchy and determine a closest match. The key generator module/circuit 1818 generates the cryptographic key based on the key components using the methods described herein.

The device 1802 further includes a memory/storage device 1820 coupled to the processing circuit 1804. The memory/storage device 1820 stores, e.g., a hierarchy of biometric descriptors 1822 and biometric lock information 1824 associated with a user identifier 1826. The device 1802 includes a network interface circuit for communication over a communication network environment. The device 1802 includes biosensor circuit 1830 configured to scan or image or otherwise capture fingerprint data from a biometric 1834, wherein the biometric includes a set of fingerprints.

Figure 19:
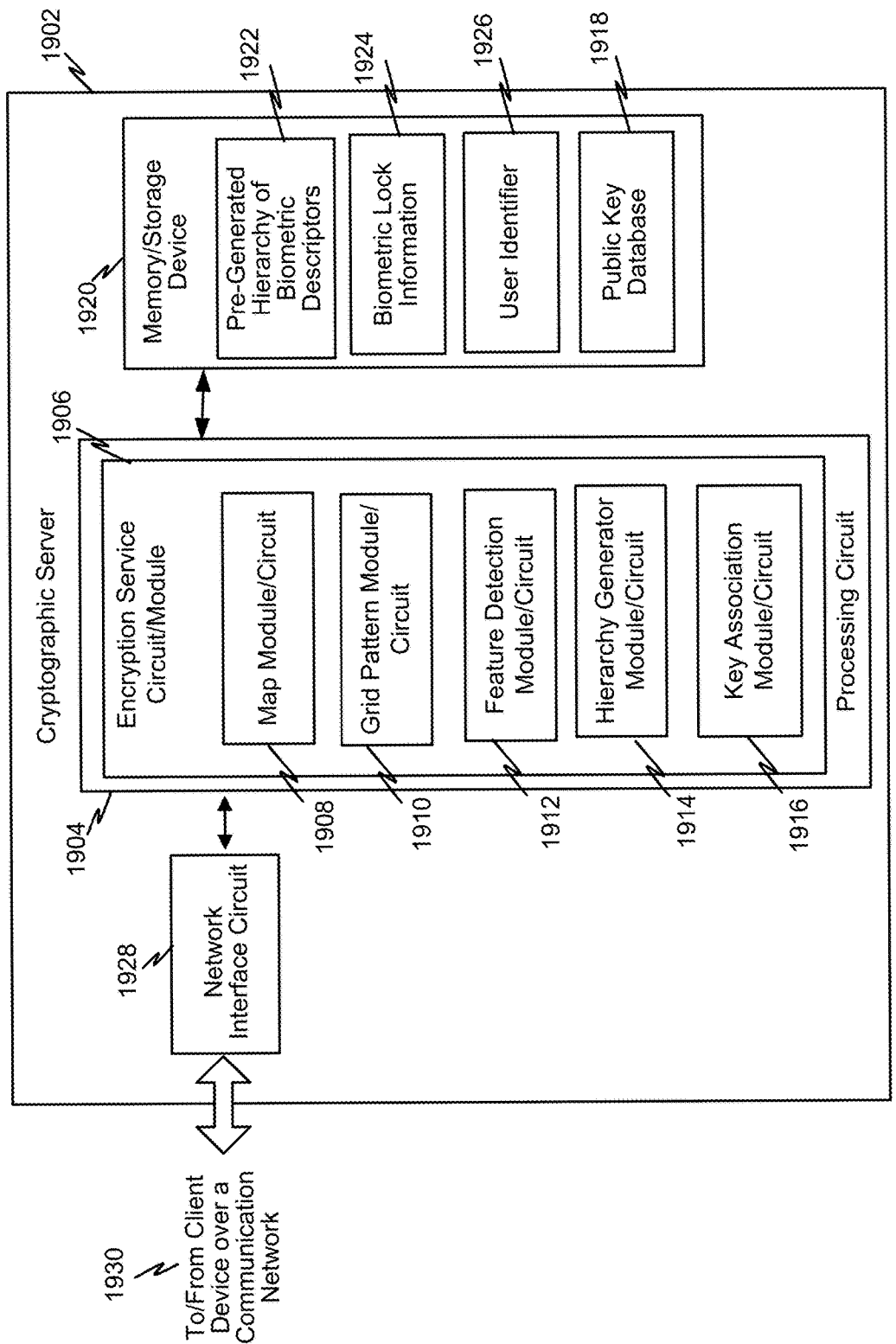
FIG. 19 illustrates a schematic block diagram of an embodiment of a cryptographic server configured for providing an encryption service.

FIG. 19 illustrates a schematic block diagram of an embodiment of a cryptographic server 1902 configured for providing an encryption service to a plurality of client devices. The cryptographic server 1902 includes a processing circuit 1904, a network interface circuit 1928 and a memory/storage device 1920. The processing circuit 1904 includes at least an encryption service circuit/module 1906 that provides the encryption services to a plurality of client devices as described herein. In an exemplary embodiment, the cryptographic server 1902 generates the pre-generated hierarchy of biometric descriptors 1922 stored in the memory/storage device 1920 and the biometric descriptors for one or more levels of the pre-generated hierarchy of biometric descriptors. In an embodiment, the pre-generated hierarchy of biometric descriptors 1922 is pre-generated for a plurality of users, e.g. the hierarchy of biometric descriptors 1922 is generated without using the biometric data of the plurality of users. In general, the biometric descriptors may be generated based on data from actual biometrics or synthetically generated. When the pre-generated hierarchy of biometric descriptors is modified or updated during cryptographic key generation for a user, the updated hierarchy of biometric descriptors is stored as part of the biometric lock information associated with the user identifier.

Various modules and functions of the encryption service circuit/module include a map module/circuit 1908, a grid pattern module/circuit 1910, a feature detection module/circuit 1912 and a key association module/circuit 1916. Though the various modules are shown as separate modules, one or more of the functions of the modules may be combined into another module or functions further segmented into additional modules. In addition, the modules may be integrated into one or more devices or may be separate devices. Additional modules or other components may also be included in the cryptographic server 1902 to perform the functionality described herein.

The map module/circuit 1908 is operable to synthetically generate a plurality of ridge maps or generate a plurality of ridge maps using actual biometric data or synthetically generated for one or more levels of the pre-generated hierarchy of biometric descriptors 1922. The map module/circuit 1908 is further operable to generate a plurality of density maps and contour maps, e.g. using the methods described herein.

The feature detection module/circuit 1912 processes the contour maps to detect one or more features, such as minutiae points and ridge characteristics. For example, the feature detection module/circuit 1912 is operable to detect features from the contour maps for generating a ridge map as described herein, such as location and number of minutiae and density of ridges. In an embodiment, the feature detection module/circuit 1912 accesses feature templates or vectors that represent the various features. The feature detection module/circuit 1912 compares a subset of the contour map with a feature vector. Matched filters, correlation filters, Gabor filters (with Gabor wavelets, log-Gabor wavelets) and Fourier transforms can be used to perform the comparison between the feature vector and subset. Based on the comparison, the feature detection module/circuit 1912 determines the presence, type, location or other specified criteria of features in the fingerprint.

The feature detection module/circuit 1912 outputs the feature data for the contour map. The feature data includes a list of features with 2D coordinates and type of feature. In an embodiment, the feature data further includes relative placement of the features with respect to other features. For example, it may include a distance or number of ridgelines between features. The feature data may further include an orientation angle of a feature. When a feature includes a vector or gradient vector, the feature data includes vector coordinates, such as orientation angle of the vector and value for the vector.

The grid pattern module/circuit 1910 is operable to generate grid patterns and vectors from the contour map and the feature data. For example, the grid pattern module/circuit 1910 is operable to overlay an m*n grid over the contour map and determine specified criteria, such as number of minutiae or ridges, about the cells of the grid. The grid pattern module/circuit 1910 is operable to generate a grid pattern and map the grid pattern into vectors, as described herein. The key association module/circuit 1916 is operable to associate a key component to each of the biometric descriptors in the pre-generated hierarchy of biometric descriptors 1922.

The cryptographic server 1902 further includes the memory/storage device 1920 coupled to the processing circuit 1904. The memory/storage device 1920 stores, e.g., the pre-generated hierarchy of biometric descriptors 1922 and biometric lock information 1924 associated with a user identifier 1926. The memory/storage device 1920 may also store a public key database 1918 that includes a plurality of public keys and associated user identifiers. In an embodiment, some of the plurality of the public keys are generated using associated cryptographic keys generated using biometric data as described herein. The cryptographic server 1902 also includes the network interface circuit that is operably coupled to the processing circuit 1904 for communication to and from the plurality of client devices over a communication network environment.

Figure 20:
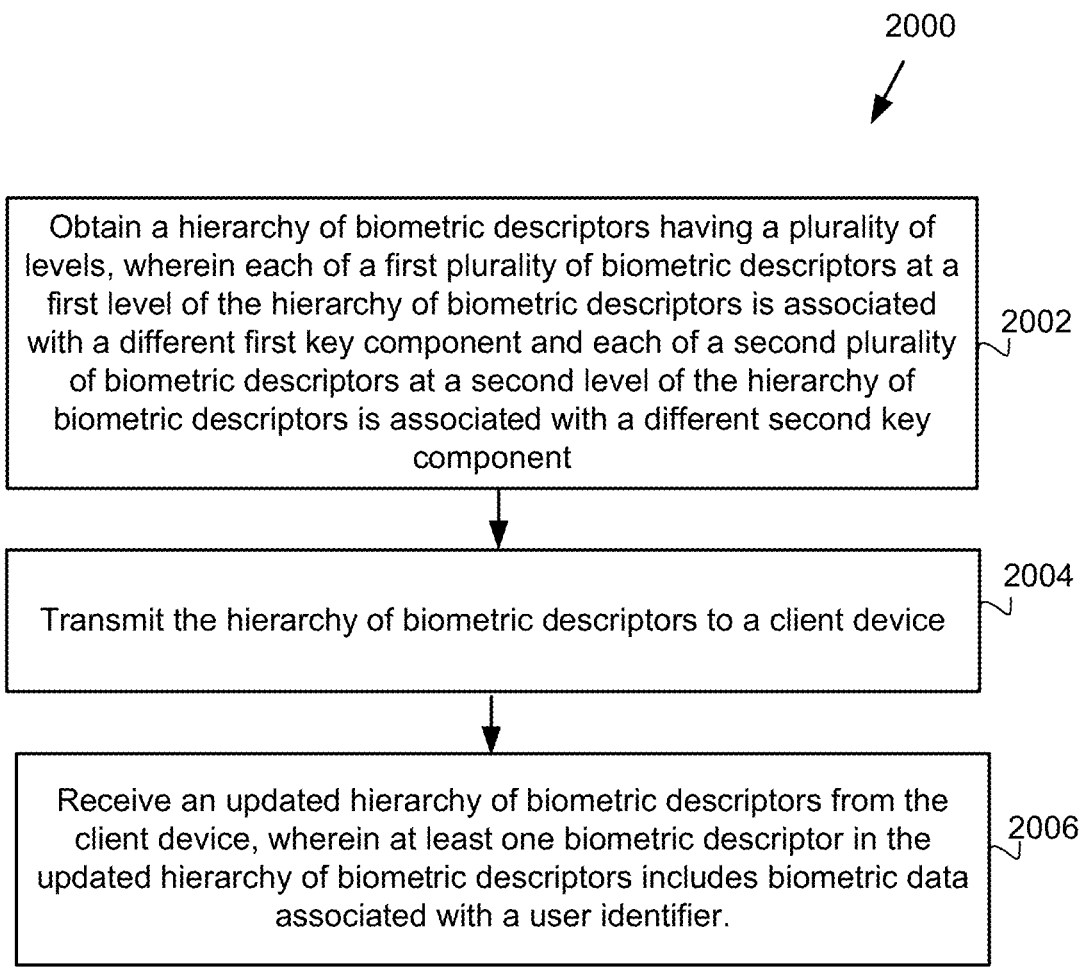
FIG. 20 illustrates a logic flow diagram of an embodiment of a method for providing an encryption service.

FIG. 20 illustrates a logic flow diagram of an embodiment of a method 2000 for providing an encryption service. A hierarchy of biometric descriptors having a plurality of levels is obtained, wherein each of a first plurality of biometric descriptors at a first level of the hierarchy of biometric descriptors is associated with a different first key component and each of a second plurality of biometric descriptors at a second level of the hierarchy of biometric descriptors is associated with a different second key component 2002. In an exemplary embodiment, the server provides an encryption service to a plurality of client devices. As part of the encryption service, the cryptographic server obtains a hierarchy of biometric descriptors intended for use by the plurality of client devices to generate a cryptographic key associated with a user identifier.

The hierarchy of biometric descriptors is transmitted to the client device 2004. In an embodiment, the hierarchy of biometric descriptors is transmitted to the client device in response to an initiation of a transaction with the client device. For example, the server receives a request from the client device to register a user with the server for the encryption service, wherein the request includes a user identifier associated with the user. The server transmits the hierarchy of biometric descriptors to the client device in response thereto. In another example, the server receives a request from the client device to generate a cryptographic key for a registered user associated with a user identifier, and the server transmits the hierarchy of biometric descriptors to the client device in response thereto.

In some but not all embodiments, the server receives an updated hierarchy of biometric descriptors from the client device, wherein at least one biometric descriptor in the updated hierarchy of biometric descriptors includes biometric data associated with a user identifier 2006. In some but not all embodiments, the server receives an updated hierarchy of biometric descriptors from the client device, wherein a subset of the second plurality of biometric descriptors in the second level of the updated hierarchy of biometric descriptors includes a sparse biometric descriptor having a similarity parameter less than a first specified threshold to a biometric descriptor derived from biometric data associated with a user identifier and a plurality of selected biometric descriptors having a similarity parameter greater than a second specified threshold from the sparse biometric descriptor. The server receives any updated hierarchy of biometric descriptors from the client device with an associated user identifier. The server stores the updated hierarchy of biometric with the associated user identifier.

One or more of the components, steps, features and/or functions illustrated in the Figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method, comprising:
   obtaining biometric data;
   selecting a first biometric descriptor at a first level of a hierarchy of biometric descriptors using the biometric data, wherein the first biometric descriptor is associated with a subset of biometric descriptors at a second level of the hierarchy of biometric descriptors;
   obtaining a first key component associated with the first biometric descriptor;
   selecting a second biometric descriptor from the subset of biometric descriptors at the second level using the first biometric descriptor and the biometric data;
   obtaining a second key component associated with the second biometric descriptor; and
   generating a cryptographic key using at least the first key component and the second key component.

2. The method of claim 1, wherein selecting the second biometric descriptor comprises:
   obtaining the subset of biometric descriptors at the second level associated with the first biometric descriptor; and
   comparing the biometric data with the subset of biometric descriptors; and
   selecting the second biometric descriptor.

3. The method of claim 1, further comprising:
   obtaining at least one additional lower level of the hierarchy of biometric descriptors; and
   for each additional lower level, selecting an additional biometric descriptor and obtaining an additional key component based at least on the additional biometric descriptor.

4. The method of claim 3, wherein generating the cryptographic key using at least the first key component and the second key component, comprises:
   generating the cryptographic key using at least the first key component, the second key component and the additional key component for each additional lower level.

5. The method of claim 1, wherein the biometric data includes fingerprint data for at least one fingerprint in a set of fingerprints.

6. The method of claim 5, wherein the first level of the hierarchy of biometric descriptors includes a plurality of fingerprint types and the second level of the hierarchy of biometric descriptors includes a plurality of distributions of macro-singularities.

7. The method of claim 6, wherein the hierarchy of biometric descriptors further comprises a third level including a plurality of third level ridge maps.

8. The method of claim 7, further comprising:
   processing the fingerprint data to obtain a ridge map based on the at least one fingerprint in the set of fingerprints;
   selecting a third level ridge map using the ridge map based on the at least one fingerprint in the set of fingerprints; and
   obtaining a third key component based on the selected third level ridge map.

9. The method of claim 8, wherein processing the fingerprint data to obtain a ridge map based on the at least one fingerprint in the set of fingerprints, comprises:
   determining an orientation of ridges at a plurality of points in the at least one fingerprint in the set of fingerprints;
   representing the determined orientation of the ridges at the plurality of points as vectors to generate the ridge map.

10. The method of claim 7, wherein the hierarchy of biometric descriptors further comprises a fourth level including a plurality of fourth level grid patterns.

11. The method of claim 10, further comprising:
    processing the fingerprint data to obtain a grid pattern based on the at least one fingerprint in the set of fingerprints;
    selecting a fourth level grid pattern using the grid pattern based on the at least one fingerprint in the set of fingerprints; and
    obtaining a fourth key component based on the selected fourth level grid pattern.

12. The method of claim 11, wherein processing the fingerprint data to obtain the grid pattern based on the at least one fingerprint in the set of fingerprints, comprises:
    aligning the ridge map to the selected third level ridge map;
    overlaying an m*n grid on the ridge map;
    selecting cells in the m*n grid that meet a specified criteria; and
    generating a grid pattern based on the selected cells.

13. A device, comprising:
    a biosensor circuit configured to obtain biometric data;
    a processing circuit coupled to the biosensor circuit, wherein the processing circuit is configured to:
      select a first biometric descriptor at a first level of a hierarchy of biometric descriptors using the biometric data, wherein the first biometric descriptor is associated with a subset of biometric descriptors at a second level of the hierarchy of biometric descriptors;
      obtain a first key component associated with the first biometric descriptor;
      select a second biometric descriptor from the subset of biometric descriptors at the second level using the first biometric descriptor and the biometric data;
      obtain a second key component associated with the second biometric descriptor; and
      generate a cryptographic key using at least the first key component and the second key component.

14. The device of claim 13, wherein the processing circuit is further configured to:
    obtain the subset of biometric descriptors at the second level associated with the first biometric descriptor; and compare the biometric data with the subset of biometric descriptors; and select the second biometric descriptor.

15. The device of claim 14, wherein the processing circuit is further configured to:

obtain an additional lower level of the hierarchy of biometric descriptors; and for the additional lower level, select an additional biometric descriptor at the additional lower level and obtain an additional key component based at least on the selected additional biometric descriptor.

16. The device of claim 15, wherein the processing circuit is further configured to:

generate the cryptographic key using at least the first key component, the second key component and the additional key component.

17. A non-transitory computer readable storage medium having instructions stored thereon, which when executed by one or more processors causes the one or more processors to:

obtain biometric data;

select a first biometric descriptor at a first level of a hierarchy of biometric descriptors using the biometric data, wherein the first biometric descriptor is associated with a subset of biometric descriptors at a second level of the hierarchy of biometric descriptors;

obtain a first key component associated with the first biometric descriptor;

select a second biometric descriptor from the subset of biometric descriptors at the second level using the first biometric descriptor and the biometric data;

obtain a second key component associated with the second biometric descriptor; and generate a cryptographic key using at least the first key component and the second key component.

18. A hardware device, comprising:

means for obtaining biometric data;

means for selecting a first biometric descriptor at a first level of a hierarchy of biometric descriptors using the biometric data, wherein the first biometric descriptor is associated with a subset of biometric descriptors at a second level of the hierarchy of biometric descriptors;

means for obtaining a first key component associated with the first biometric descriptor;

means for selecting a second biometric descriptor from the subset of biometric descriptors at the second level using the first biometric descriptor and the biometric data;

means for obtaining a second key component associated with the second biometric descriptor; and means for generating a cryptographic key using at least the first key component and the second key component.

19. A server, comprising:

a network interface configured to communicate with a client device;

a processing circuit operably coupled to the network interface, wherein the processing circuit is configured to:

obtain a hierarchy of biometric descriptors having a plurality of levels, wherein each of a first plurality of biometric descriptors at a first level of the hierarchy of biometric descriptors is associated with a different first key component and each of a second plurality of biometric descriptors at a second level of the hierarchy of biometric descriptors is associated with a different second key component, and wherein a first biometric descriptor at the first level is associated with a subset of biometric descriptors at the second level; and transmit the hierarchy of biometric descriptors to the client device, wherein the hierarchy of biometric descriptors facilitates a generation of a cryptographic key at the client device using at least a first key component associated with the first biometric descriptor and a second key component associated with a second biometric descriptor selected from the subset of biometric descriptors using the first biometric descriptor.

20. The server of claim 19, wherein the processing circuit is further configured to:

receive a public key from the client device, wherein the public key is based at least in part on the first key component and the second key component.

21. The server of claim 19, wherein the first plurality of biometric descriptors and the second plurality of biometric descriptors are synthetically pre-generated.

22. The server of claim 21, wherein the first plurality of biometric descriptors includes a plurality of synthetically generated ridge maps and wherein the second plurality of biometric descriptors includes a plurality of synthetically generated grid patterns.

23. The server of claim 21, wherein the processing circuit is further configured to:

receive an updated hierarchy of biometric descriptors from the client device, wherein at least one biometric descriptor in the updated hierarchy of biometric descriptors includes biometric data associated with a user identifier.

24. The server of claim 21, wherein the processing circuit is further configured to:

receive an updated hierarchy of biometric descriptors from the client device, wherein a subset of the second plurality of biometric descriptors in the second level of the updated hierarchy of biometric descriptors includes:

a sparse biometric descriptor having a similarity parameter less than a first specified threshold to a biometric descriptor derived from biometric data associated with a user identifier; and a plurality of selected biometric descriptors having a similarity parameter greater than a second specified threshold from the sparse biometric descriptor.

25. The server of claim 19, wherein the processing circuit is configured to transmit the hierarchy of biometric descriptors to the client device in response to an initiation of a transaction with the client device.

26. A method, comprising:

obtaining a hierarchy of biometric descriptors having a plurality of levels, wherein each of a first plurality of biometric descriptors at a first level of the hierarchy of biometric descriptors is associated with a different first key component and each of a second plurality of biometric descriptors at a second level of the hierarchy of biometric descriptors is associated with a different second key component, and wherein a first biometric descriptor at the first level is associated with a subset of biometric descriptors at the second level; and transmitting the hierarchy of biometric descriptors to a client device, wherein the hierarchy of biometric descriptors facilitates a generation of a cryptographic key at the client device using at least a first key component associated with the first biometric descriptor and a second key component associated with a second biometric descriptor selected from the subset of biometric descriptors using the first biometric descriptor.

27. The method of claim 26, further comprising:
receiving a public key from the client device, wherein the public key is based at least in part on the first key component and the second key component.

28. The method of claim 26, wherein the first plurality of biometric descriptors and the second plurality of biometric descriptors are synthetically pre-generated.

29. The method of claim 28, wherein the first plurality of biometric descriptors includes a plurality of synthetically generated ridge maps and wherein the second plurality of biometric descriptors includes a plurality of synthetically generated grid patterns.

30. The method of claim 28, further comprising:
receiving an updated hierarchy of biometric descriptors from the client device, wherein at least one biometric descriptor in the updated hierarchy of biometric descriptors includes biometric data associated with a user identifier.

31. The method of claim 28, further comprising:
receiving an updated hierarchy of biometric descriptors from the client device, wherein a subset of the second plurality of biometric descriptors in the second level of the updated hierarchy of biometric descriptors includes:
 a sparse biometric descriptor having a similarity parameter less than a first specified threshold to a biometric descriptor derived from biometric data associated with a user identifier; and
 a plurality of selected biometric descriptors having a similarity parameter greater than a second specified threshold from the sparse biometric descriptor.

32. The method of claim 31, wherein the hierarchy of biometric descriptors is transmitted to the client device in response to an initiation of a transaction with the client device.

33. A non-transitory computer readable storage medium having instructions stored thereon, which when executed by one or more processors causes the one or more processors to:

obtain a hierarchy of biometric descriptors having a plurality of levels, wherein each of a first plurality of biometric descriptors at a first level of the hierarchy of biometric descriptors is associated with a different first key component and each of a second plurality of biometric descriptors at a second level of the hierarchy of biometric descriptors is associated with a different second key component, and wherein a first biometric descriptor at the first level is associated with a subset of biometric descriptors at the second level; and transmit the hierarchy of biometric descriptors to a client device, wherein the hierarchy of biometric descriptors facilitates a generation of a cryptographic key at the client device using at least a first key component associated with the first biometric descriptor and a second key component associated with a second biometric descriptor selected from the subset of biometric descriptors using the first biometric descriptor.

34. A hardware device, comprising:
means for obtaining a hierarchy of biometric descriptors having a plurality of levels, wherein each of a first plurality of biometric descriptors at a first level of the hierarchy of biometric descriptors is associated with a different first key component and each of a second plurality of biometric descriptors at a second level of the hierarchy of biometric descriptors is associated with a different second key component, and wherein a first biometric descriptor at the first level is associated with a subset of biometric descriptors at the second level; and means for transmitting the hierarchy of biometric descriptors to a client device, wherein the hierarchy of biometric descriptors facilitates a generation of a cryptographic key at the client device using at least a first key component associated with the first biometric descriptor and a second key component associated with a second biometric descriptor selected from the subset of biometric descriptors using the first biometric descriptor.

* * * * *